(12) United States Patent
Nonaka et al.

(10) Patent No.: US 12,173,757 B2
(45) Date of Patent: Dec. 24, 2024

(54) CLUTCH DEVICE AND MOTORCYCLE

(71) Applicant: Kabushiki Kaisha F.C.C., Hamamatsu (JP)

(72) Inventors: Masayuki Nonaka, Hamamatsu (JP); Yuki Kobayashi, Hamamatsu (JP)

(73) Assignee: KABUSHIKI KAISHA F.C.C., Shizuoka (JP)

( * ) Notice: Subject to any disclaimer, the term of this patent is extended or adjusted under 35 U.S.C. 154(b) by 0 days.

(21) Appl. No.: 18/218,296

(22) Filed: Jul. 5, 2023

(65) Prior Publication Data
US 2024/0011531 A1 Jan. 11, 2024

(30) Foreign Application Priority Data

Jul. 6, 2022 (JP) .................. 2022-109217

(51) Int. Cl.
| | | |
|---|---|---|
| F16D 13/54 | (2006.01) | |
| F16D 13/52 | (2006.01) | |
| F16D 13/70 | (2006.01) | |
| F16D 23/14 | (2006.01) | |
| F16D 13/74 | (2006.01) | |
| F16D 23/12 | (2006.01) | |

(52) U.S. Cl.
CPC ............ *F16D 23/14* (2013.01); *F16D 13/52* (2013.01); *F16D 13/70* (2013.01); *F16D 13/74* (2013.01); *F16D 2023/123* (2013.01)

(58) Field of Classification Search
CPC ....................... F16D 13/54–2013/565
See application file for complete search history.

(56) References Cited

U.S. PATENT DOCUMENTS

| | | | | |
|---|---|---|---|---|
| 7,785,224 B2 * | 8/2010 | York | ...................... | F16H 48/30 |
| | | | | 335/279 |
| 11,841,053 B1 * | 12/2023 | Furuhashi | ............... | F16D 13/56 |

(Continued)

FOREIGN PATENT DOCUMENTS

| | | | | |
|---|---|---|---|---|
| EP | 3757425 A1 * | 12/2020 | ............. | B63H 20/20 |
| EP | 3998412 A1 * | 5/2022 | | |

(Continued)

OTHER PUBLICATIONS

Official Communication issued in Japanese Patent Application No. 2022-109217, mailed on Oct. 18, 2022.

(Continued)

*Primary Examiner* — Ernesto A Suarez
*Assistant Examiner* — Lillian T Nguyen
(74) *Attorney, Agent, or Firm* — Keating & Bennett, LLP

(57) ABSTRACT

A clutch device includes a clutch center including center-side fitting teeth, and a pressure plate including pressure-side fitting teeth. When a center-side assist cam surface and a pressure-side assist cam surface contact each other, an end of each of the pressure-side fitting teeth in a first direction is located ahead, in the first direction, of an end of a corresponding one of the center-side fitting teeth in a second direction, and at least portions of some of the pressure-side fitting teeth overlap with the center-side fitting teeth when seen in radial directions of the output shaft, and at least portions of others of the pressure-side fitting teeth do not overlap with the center-side fitting teeth when seen in radial directions of the output shaft.

13 Claims, 16 Drawing Sheets

(56) References Cited

U.S. PATENT DOCUMENTS

| | | | |
|---|---|---|---|
| 2017/0159724 A1* | 6/2017 | Imanishi | F16D 13/56 |
| 2017/0184156 A1* | 6/2017 | Kataoka | F16D 13/52 |
| 2019/0017554 A1* | 1/2019 | Isobe | F16D 13/56 |
| 2019/0285122 A1* | 9/2019 | Imanishi | F16D 23/12 |
| 2020/0292010 A1* | 9/2020 | Kobayashi | F16D 13/56 |
| 2020/0340536 A1 | 10/2020 | Nishikawa et al. | |
| 2021/0033154 A1 | 2/2021 | Isobe et al. | |
| 2021/0123482 A1* | 4/2021 | Kobayashi | F16D 13/52 |

FOREIGN PATENT DOCUMENTS

| | | |
|---|---|---|
| JP | 07-224863 A | 8/1995 |
| JP | 2019-158087 A | 9/2019 |
| JP | 6903020 B2 | 7/2021 |
| JP | 2022-072810 A | 5/2022 |

OTHER PUBLICATIONS

Official Communication issued in Japanese Patent Application No. 2022-109217, mailed on Jan. 10, 2023.
Official Communication issued in International Patent Application No. PCT/JP2023/022820, mailed on Sep. 5, 2023.

\* cited by examiner

CLUTCH DEVICE AND MOTORCYCLE

CROSS REFERENCE TO RELATED APPLICATIONS

This application claims the benefit of priority to Japanese Patent No. 2022-109217 filed on Jul. 6, 2022. The entire contents of this application are hereby incorporated herein by reference.

BACKGROUND OF THE INVENTION

1. Field of the Invention

The present disclosure relates to a clutch device and a motorcycle. More particularly, the present disclosure relates to a clutch device that arbitrarily allows or interrupts transfer of a rotation driving force of an input shaft that is rotationally driven by a prime mover such as an engine to an output shaft, and also relates to a motorcycle including the clutch device.

2. Description of the Related Art

Conventional vehicles such as motorcycles include clutch devices. A clutch device is located between an engine and a drive wheel and allows or interrupts transfer of a rotation driving force of the engine to the drive wheel. The clutch device generally includes a plurality of input-side rotating plates that rotate in response to a rotation driving force of an engine and a plurality of output-side rotating plates connected to an output shaft that transfers the rotation driving force to a drive wheel. The input-side rotating plates and the output-side rotating plates are alternately arranged in a stacking direction, and the input-side rotating plates and the output-side rotating plates are brought into pressure contact with each other and are separated from each other so that transfer of a rotation driving force is allowed or interrupted.

Japanese Patent No. 6903020, for example, discloses a clutch device including a clutch center (clutch member) that holds output-side rotating plates (driven-side clutch plates), and a pressure plate (pressure member) movable toward or away from the clutch center. The pressure plate is configured to press the input-side rotating plates and the output-side rotating plates. In this manner, the clutch device uses an assembly of the clutch center and the pressure plate.

In the clutch device of Japanese Patent No. 6903020, as portions holding the output-side rotating plates, the clutch center includes center-side fitting teeth (outer peripheral wall including splines), and the pressure plate includes pressure-side fitting teeth. In a state where the clutch center and the pressure plate are assembled, the center-side fitting teeth and the pressure-side fitting teeth overlap with each other in the radial direction.

In the portion where the center-side fitting teeth and the pressure-side fitting teeth overlap with each other in the radial direction, oil that has flowed to from the inside to the outside of the clutch center tends to be accumulated. Clutch oil is preferably supplied in a balanced manner to the whole of the output-side rotating plates held by the clutch center and the pressure plate and the input-side rotating plates located between the output-side rotating plates.

SUMMARY OF THE INVENTION

Preferred embodiments of the present disclosure provide clutch devices each capable of more efficiently supplying clutch oil to output-side rotating plates and input-side rotating plates, and motorcycles including such clutch devices.

A clutch device according to a preferred embodiment of the present disclosure is a clutch divide that allows or interrupts transfer of a rotation driving force of an input shaft, and includes a clutch housing holding a plurality of input-side rotating plates to be rotationally driven by rotational driving of the input shaft, and a clutch center housed in the clutch housing and operable to hold a plurality of output-side rotating plates and to be rotationally driven together with the output shaft, the input-side rotating plates and the output-side rotating plates being alternately arranged, and a pressure plate movable toward or away from the clutch center and rotatable relative to the clutch center to press the input-side rotating plates and the output-side rotating plates. The clutch center includes an output shaft holding portion to which the output shaft is coupled, an outer peripheral wall located radially outward of the output shaft holding portion, a plurality of center-side fitting teeth holding the output-side rotating plates, projecting radially outward from an outer peripheral surface of the outer peripheral wall, and arranged in circumferential directions, and a plurality of spline grooves each located between adjacent ones of the center-side fitting teeth. The pressure plate includes a plurality of pressure-side fitting teeth holding the output-side rotating plates and arranged in the circumferential directions. The pressure-side fitting teeth are located radially outward of the center-side fitting teeth. Assuming a direction in which the pressure plate approaches the clutch center is a first direction and a direction in which the pressure plate moves away from the clutch center is a second direction, an end of each of the pressure-side fitting teeth in the first direction is located ahead, in the first direction, of an end of a corresponding one of the center-side fitting teeth in the second direction. At least portions of some of the plurality of pressure-side fitting teeth overlap with the center-side fitting teeth when seen in radial directions of the output shaft, and at least portions of others of the plurality of pressure-side fitting teeth do not overlap with the center-side fitting teeth when seen in radial directions of the output shaft.

In a clutch device according to a preferred embodiment of the present disclosure, clutch oil that has flowed out of, for example, the output shaft is discharged to the outside of the clutch center through, for example, the oil flow hole. Since the input-side rotating plates and the output-side rotating plates are held outside the clutch center, while the pressure plate and the clutch center rotate, clutch oil is partially supplied to the input-side rotating plates and the output-side rotating plates. In addition, the pressure-side fitting teeth are located radially outward of the center-side fitting teeth. The end of each of the pressure-side fitting teeth in the first direction is located ahead, in the first direction, of the end of the corresponding one of the center-side fitting teeth in the second direction. At least portions of some of the plurality of pressure-side fitting teeth overlap with the center-side fitting teeth in the radial directions. Thus, in these portions, even while the pressure plate and the clutch center rotate, a portion of clutch oil is not spattered and can be held. Accordingly, clutch oil can be supplied little by little to the output-side rotating plates and the input-side rotating plates near the pressure plate. On the other hand, at least portions of other pressure-side fitting teeth of the plurality of pressure-side fitting teeth do not overlap with the center-side fitting teeth in the radial direction. Accordingly, in these portions, when the pressure plate and the clutch center, clutch oil is spattered to the outside, and thus, clutch oil can be immediately supplied to the output-side rotating plates and the input-side rotating plates.

Preferred embodiments of the present disclosure provide clutch devices each capable of more efficiently supplying clutch oil to output-side rotating plates and input-side rotating plates.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
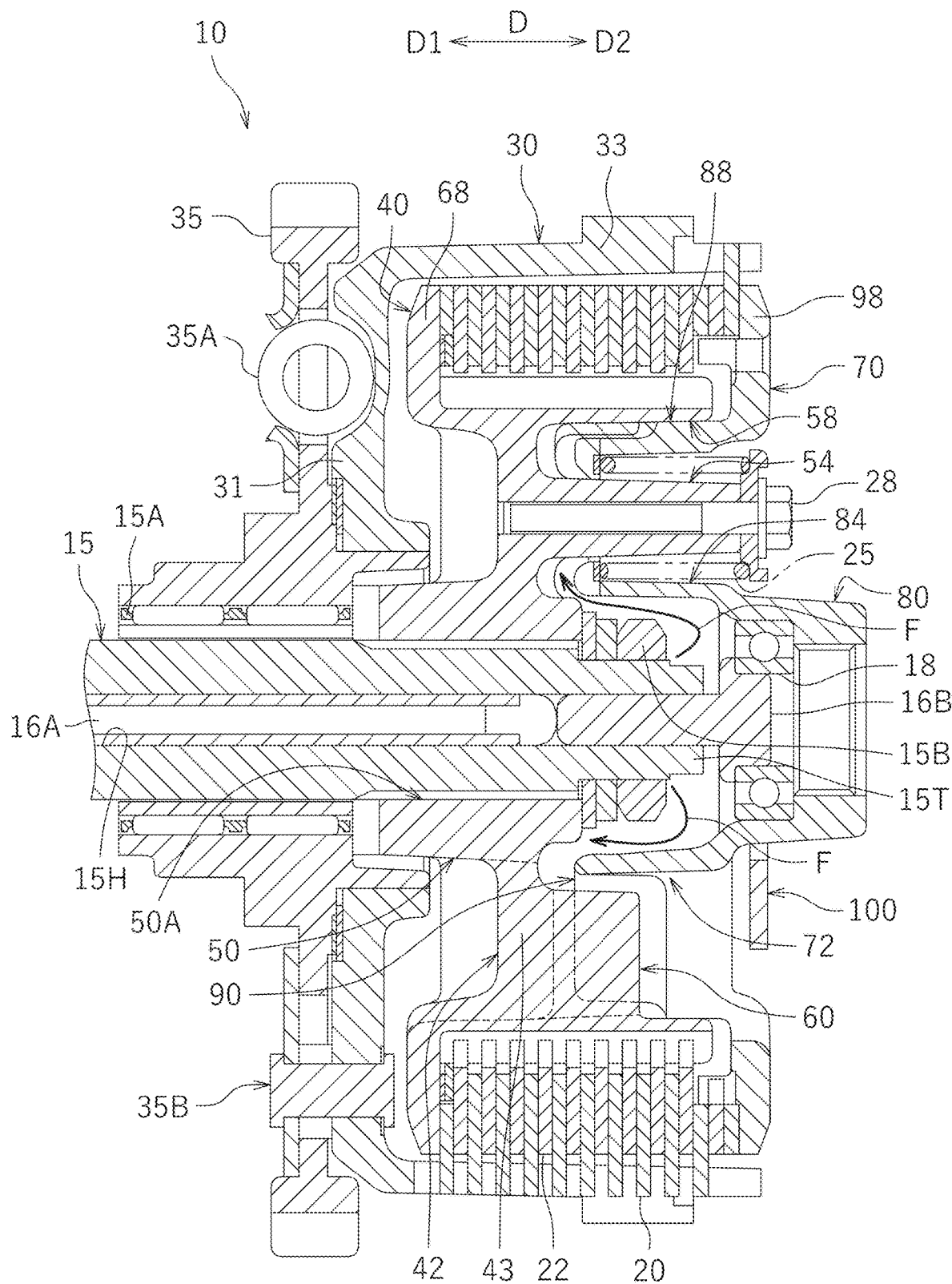
FIG. 1 is a cross-sectional view of a clutch device according to a first preferred embodiment of the present invention.

Clutch devices according to preferred embodiments of the present disclosure will be described hereinafter with reference to the drawings. The preferred embodiments described herein are, of course, not intended to particularly limit the present disclosure. Elements and features having the same functions are denoted by the same reference characters, and description for the same elements and features will not be repeated or will be simplified as appropriate.

FIG. 1 is a cross-sectional view of a clutch device 10 according to a preferred embodiment of the present invention. The clutch device 10 is provided in a vehicle such as a motorcycle, for example. The clutch device 10 allows or interrupts transfer of a rotation driving force of an input shaft (crankshaft) of an engine of the motorcycle to an output shaft 15, for example. The clutch device 10 allows or interrupts transfer of a rotation driving force of the input shaft to a drive wheel (rear wheel) through the output shaft 15. The clutch device 10 is located between the engine and a transmission.

In the following description, directions in which a pressure plate 70 and the clutch center 40 are arranged will be referred to as directions D, a direction in which the pressure plate 70 moves toward the clutch center 40 will be referred to as a first direction D1, and a direction in which the pressure plate 70 moves away from the clutch center 40 will be referred to as a second direction D2. Circumferential directions of the clutch center 40 and the pressure plate 70 will be referred to as circumferential directions S, one of the circumferential direction S from one pressure-side cam portion 90 to another pressure-side cam portion 90 will be referred to as a first circumferential direction S1 (see FIG. 5), and one of the circumferential direction S from the other pressure-side cam portion 90 to the one pressure-side cam portion 90 will be referred to as a second circumferential direction S2 (see FIG. 5). In this preferred embodiment, axial directions of the output shaft 15, axial directions of a clutch housing 30, axial directions of the clutch center 40, and axial directions of the pressure plate 70 are the same as the directions D. The pressure plate 70 and the clutch center 40 rotate in the first circumferential direction S1. It should be noted that the directions described above are defined simply for convenience of description, and are not intended to limit the state of installation of the clutch device 10 and do not limit the present disclosure.

As illustrated in FIG. 1, the clutch device 10 includes the output shaft 15, input-side rotating plates 20, output-side rotating plates 22, the clutch housing 30, the clutch center 40, the pressure plate 70, and a stopper plate 100.

As illustrated in FIG. 1, the output shaft 15 is a hollow shaft. One end of the output shaft 15 rotatably supports an input gear 35 described later and the clutch housing 30 through a needle bearing 15A. The output shaft 15 fixedly supports a clutch center 40 through a nut 15B. That is, the output shaft 15 rotates together with the clutch center 40. The other end of the output shaft 15 is coupled to a transmission (not shown) of an automobile, for example.

As illustrated in FIG. 1, the output shaft 15 includes, in a hollow portion 15H thereof, a push rod 16A and a push member 16B adjacent to the push rod 16A. The hollow portion 15H defines and functions as a channel of clutch oil. Clutch oil flows in the output shaft 15, that is, in the hollow portion 15H. The push rod 16A and the push member 16B are slidable in the hollow portion 15H of the output shaft 15. The push rod 16A has one end (left end in the drawing) coupled to a clutch operation lever (not shown) of the motorcycle, and slides in the hollow portion 15H by operation of the clutch operation lever and presses the clutch push member 16B in the second direction D2. A portion of the push member 16B projects outward of the output shaft 15 (in the second direction D2 in this preferred embodiment) and is coupled to a release bearing 18 provided on the pressure plate 70. The push rod 16A and the push member 16B are thinner than the inner diameter of the hollow portion 15H so that flowability of clutch oil is obtained in the hollow portion 15H.

The clutch housing 30 is made of an aluminum alloy. The clutch housing 30 has a bottomed cylindrical shape. As illustrated in FIG. 1, the clutch housing 30 includes a bottom wall 31 having a substantially circular shape, and a side wall 33 extending from an edge of the bottom wall 31 in the second direction D2. The clutch housing 30 holds the plurality of input-side rotating plates 20.

As illustrated in FIG. 1, an input gear 35 is located on the bottom wall 31 of the clutch housing 30. The input gear 35 is fixed to the bottom wall 31 by a rivet 35B through a torque damper 35A. The input gear 35 meshes with a driving gear (not shown) that rotates by rotational driving of the input shaft of the engine. The input gear 35 is rotationally driven together with the clutch housing 30, independently of the output shaft 15.

The input-side rotating plates 20 is rotationally driven by rotational driving of the input shaft. As illustrated in FIG. 1, the input-side rotating plates 20 are held on the inner peripheral surface of the side wall 33 of the clutch housing 30. The input-side rotating plates 20 are held in the clutch housing 30 by spline fitting. The input-side rotating plates 20 are displaceable along the axial direction of the clutch housing 30. The input-side rotating plates 20 are rotatable together with the clutch housing 30.

The input-side rotating plates 20 are pushed against the output-side rotating plates 22. The input-side rotating plates 20 are ring-shaped flat plates. Each of the input-side rotating plates 20 is shaped by punching a thin plate of a steel plate cold commercial (SPCC) material into a ring shape. Friction members (not shown) of a plurality of paper sheets are attached to the front and back surfaces of the input-side rotating plates 20. A groove with a depth of several micrometers to several tens of micrometers is located between the friction members to hold clutch oil.

As illustrated in FIG. 1, the clutch center 40 is housed in the clutch housing 30. The clutch center 40 and the clutch housing 30 are concentrically positioned. The clutch center 40 includes a cylindrical body 42 and a flange 68 extending radially outward from the outer edge of the body 42. The clutch center 40 holds the plurality of output-side rotating plates 22 arranged alternately with the input-side rotating plates 20 in the directions D. The clutch center 40 is rotationally driven together with the output shaft 15.

Figure 2:
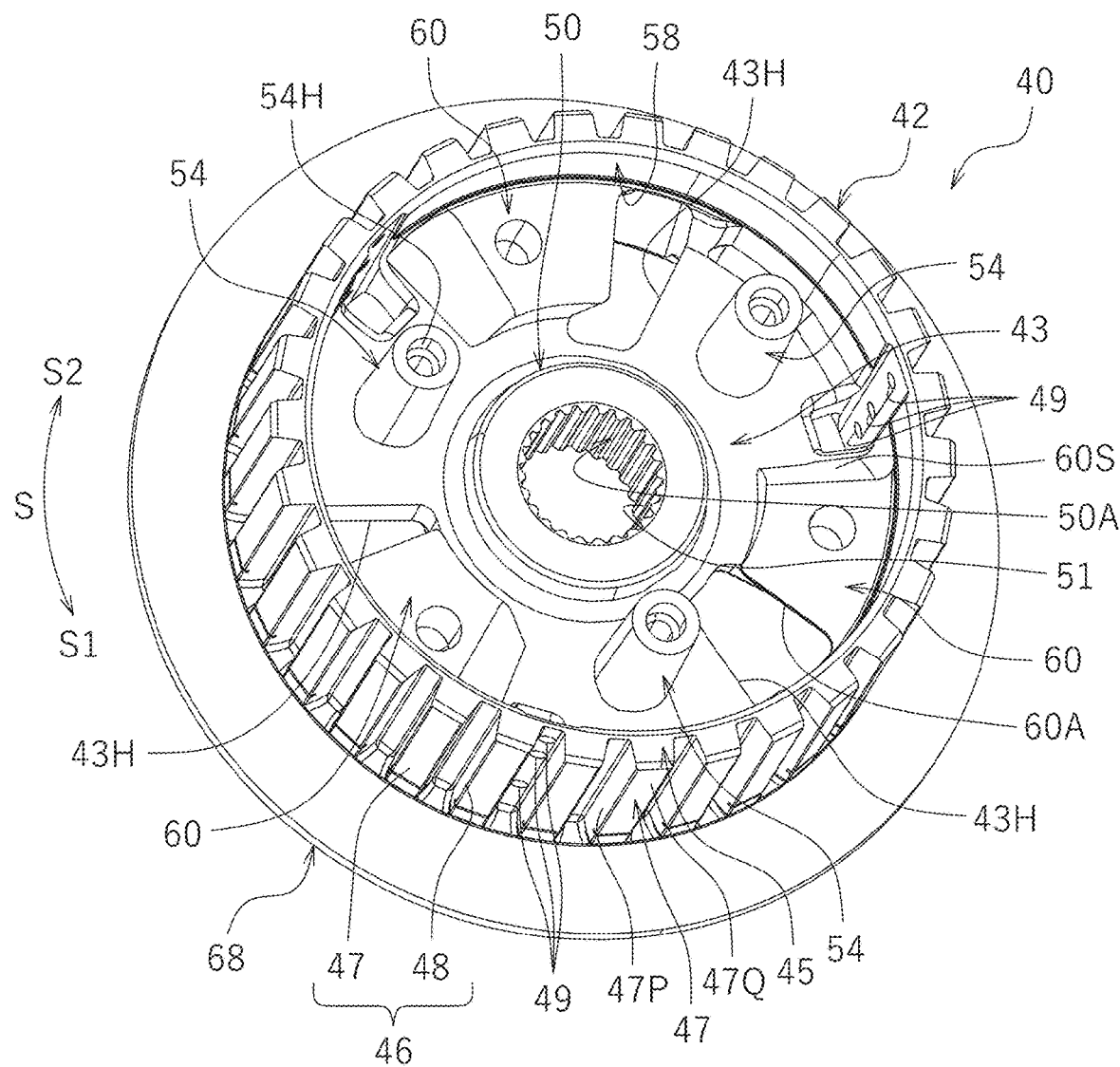
FIG. 2 is a perspective view of a clutch center according to the first preferred embodiment of the present invention.

As illustrated in FIG. 2, the body 42 includes a ring-shaped base wall 43, an outer peripheral wall 45 located radially outward of the base wall 43 and extending in the second direction D2, an output shaft holding portion 50 located at the center of the base wall 43, a plurality of center-side cam portions 60 connected to the base wall 43 and the outer peripheral wall 45, and a center-side fitting portion 58.

The output shaft holding portion 50 has a cylindrical or substantially cylindrical shape. The output shaft holding portion 50 has an insertion hole 51 in which the output shaft 15 is inserted and spline-fitted. The insertion hole 51 penetrates the base wall 43. An inner peripheral surface 50A of the output shaft holding portion 50 defining the insertion hole 51 includes a plurality of spline grooves located along the axial direction. The output shaft 15 is coupled to the output shaft holding portion 50.

Figure 3:
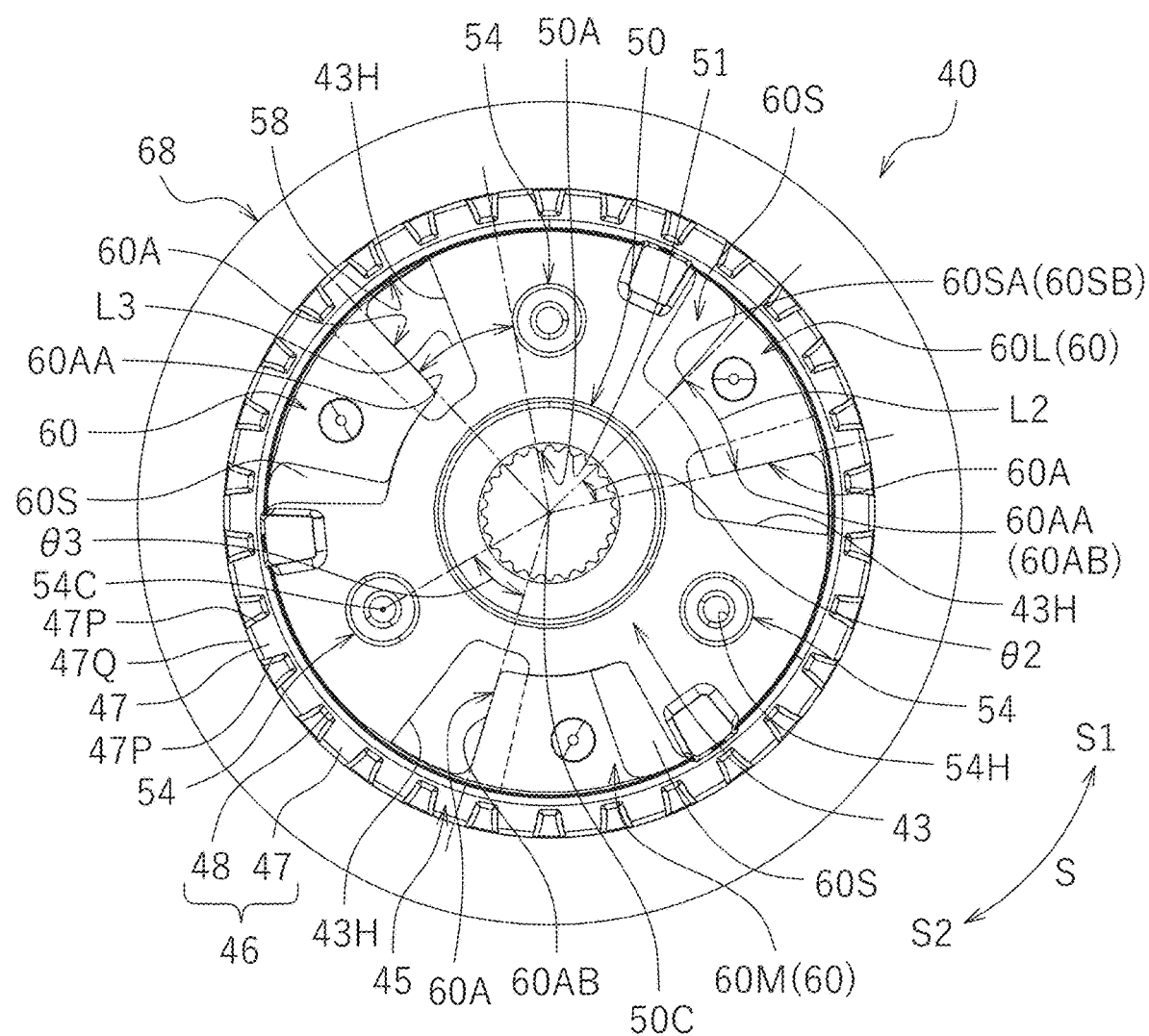
FIG. 3 is a plan view of a clutch center according to the first preferred embodiment of the present invention.

As illustrated in FIG. 2, the outer peripheral wall 45 of the clutch center 40 is located radially outward of the output shaft holding portion 50. The outer peripheral surface of the outer peripheral wall 45 includes a spline fitting portion 46. The spline fitting portion 46 includes a plurality of center-side fitting teeth 47 extending in the axial directions of the clutch center 40 along the outer peripheral surface of the outer peripheral wall 45, a plurality of spline grooves 48 each located between adjacent ones of the center-side fitting teeth 47 and extending in the axial directions of the clutch center 40, and oil flow holes 49. The center-side fitting teeth 47 hold the output-side rotating plates 22. The plurality of center-side fitting teeth 47 arranged in the circumferential directions S. The plurality of center-side fitting teeth 47 are arranged at regular or substantially regular intervals in the circumferential directions S. The plurality of center-side fitting teeth 47 have the same or substantially the same shape. The center-side fitting teeth 47 project radially outward from the outer peripheral surface of the outer peripheral wall 45. The number of the center-side fitting teeth 47 is preferably a multiple of the number of the center-side cam portions 60. In this preferred embodiment, for example, the number of the center-side cam portions 60 is three, and the number of the center-side fitting teeth 47 is 30, which will be described later. The number of the center-side fitting teeth 47 may not be a multiple of the number of the center-side cam portions 60. As illustrated in FIG. 3, each of the center-side fitting teeth 47 includes a pair of side faces 47P extending in the radial directions and a top surface 47Q connecting radially outer ends of the pair of side faces 47P. The side face 47P is an example of a first side face. The top surface 47Q is an example of a first top surface. The top surface 47Q extends in the circumferential direction S. The oil flow holes 49 penetrate the outer peripheral wall 45 along the radial directions. Each of the oil flow holes 49 is located between adjacent ones of the center-side fitting teeth 47. That is, the oil flow holes 49 are provided in the spline grooves 48. The oil flow holes 49 are located at the sides of the center-side cam portions 60. More specifically, the discharge holes 49 are located at the sides of the center-side slipper cam surfaces 60S of the center-side cam portions 60. The oil flow holes 49 are located ahead of the center-side slipper cam surfaces 60S in the second circumferential direction S2. The oil flow holes 49 are located ahead of bosses 54 described later in the first circumferential direction S1. In this preferred embodiment, three oil flow holes 49 are located in each of three portions of the outer peripheral wall 45 in the circumferential directions S. The oil flow holes 49 are arranged at regular or substantially regular intervals in the circumferential directions S. The oil flow holes 49 cause the inside and outside of the clutch center 40 to communicate with each other. The oil flow holes 49 allow clutch oil that has flowed from the output shaft 15 into the clutch center 40 to be discharged to the outside of the clutch center 40. The oil flow holes 49 allow clutch oil flowing outside the clutch center 40 to flow to the inside of the clutch center 40.

The output-side rotating plates 22 are held by the spline fitting portion 46 of the clutch center 40 and the pressure plate 70. A portion of the output-side rotating plates 22 is held by the center-side fitting teeth 47 of the clutch center 40 and the spline grooves 48 by spline fitting. Another portion of the output-side rotating plates 22 is held by a pressure-side fitting teeth 77 (see FIG. 4) of the pressure plate 70. The output-side rotating plates 22 are displaceable along the axial directions of the clutch center 40. The output-side rotating plates 22 are rotatable together with the clutch center 40.

The output-side rotating plates 22 are pushed against the input-side rotating plates 20. The output-side rotating plates 22 are ring-shaped flat plates. Each of the output-side rotating plates 22 is shaped by punching a thin plate of an SPCC material into a ring shape. The front and back surfaces of the output-side rotating plates 22 have grooves with depths of several micrometers to several tens of micrometers, for example, to hold clutch oil. The front and back surfaces of the output-side rotating plates 22 are subjected to a surface hardening treatment to enhance abrasion resistance. The friction members provided on the input-side rotating plates 20 may be provided on the output-side rotating plates 22 instead of the input-side rotating plates 20, or may be provided on both the input-side rotating plates 20 and the output-side rotating plates 22.

Each of the center-side cam portions 60 preferably has a trapezoidal shape including a cam surface of a slope defining an assist & slipper (registered trademark) mechanism that generates an assist torque as a force of increasing a pressing force (contact pressure force) between the input-side rotating plates 20 and the output-side rotating plates 22 or a slipper torque as a force of separating the input-side rotating plates 20 and the output-side rotating plates 22 from each other early and shifting these plates into a half-clutch state. The center-side cam portions 60 project from the base wall 43 in the second direction D2. As illustrated in FIG. 3, the center-side cam portions 60 are arranged at regular or substantially regular intervals in the circumferential directions S of the clutch center 40. In this preferred embodiment, the clutch center 40 includes three center-side cam portions 60, but the number of the center-side cam portions 60 is not limited to three.

As illustrated in FIG. 3, the center-side cam portions 60 are located radially outward of the output shaft holding portion 50. Each of the center-side cam portions 60 includes the center-side assist cam surface 60A and the center-side slipper cam surface 60S. The center-side assist cam surface 60A is configured to generate a force in a direction in which the pressure plate 70 approaches the clutch center 40 in order to increase a pressing force (contact pressure force) between the input-side rotating plates 20 and the output-side rotating plates 22 in relative rotation to the pressure plate 70. In this preferred embodiment, when this force is generated, the position of the pressure plate 70 to the clutch center 40 does not change, and the pressure plate 70 does not need to approach the clutch center 40 physically. The pressure plate 70 may be physically displaced with respect to the clutch center 40. The center-side slipper cam surface 60S is configured to separate the pressure plate 70 from the clutch center 40 in order to reduce the pressing force (contact pressure force) between the input-side rotating plates 20 and the output-side rotating plates 22 in relative rotation to the pressure plate 70. In the center-side cam portions 60 adjacent to each other in the circumferential directions S, the center-side assist cam surface 60A of one center-side cam portion 60L and the center-side slipper cam surface 60S of the other center-side cam portion 60M are opposed to each other in the circumferential directions S.

As illustrated in FIG. 2, the clutch center 40 includes the plurality of (for example, three in this preferred embodiment) bosses 54. The bosses 54 support the pressure plate 70. The plurality of bosses 54 are arranged at regular or substantially regular intervals in the circumferential directions S. Each of the bosses 54 has a cylindrical or substantially cylindrical shape, for example. The bosses 54 are located radially outward of the output shaft holding portion 50. The bosses 54 extend toward the pressure plate 70 (i.e., in the second direction D2). The bosses 54 are located on the base wall 43. The bosses 54 have screw holes 54H in which bolts 28 (see FIG. 1) are inserted. The screw holes 54H extend in the axial directions of the clutch center 40.

As illustrated in FIG. 2, the center-side fitting portion 58 is located radially outward of the output shaft holding portion 50. The center-side fitting portion 58 is located radially outward of the center-side cam portions 60. The center-side fitting portion 58 is located ahead of the center-side cam portions 60 in the second direction D2. The center-side fitting portion 58 is located on the inner peripheral surface of the outer peripheral wall 45. The center-side fitting portion 58 is slidably fitted onto a pressure-side fitting portion 88 (see FIG. 4) described later. The inner diameter of the center-side fitting portion 58 has a fitting tolerance allowing distribution of clutch oil flowing out of a distal end 15T of the output shaft 15 to the pressure-side fitting portion 88. That is, a gap is located between the center-side fitting portion 58 and the pressure-side fitting portion 88 described later. In this preferred embodiment, for example, the center-side fitting portion 58 has an inner diameter larger than the outer diameter of the pressure-side fitting portion 88 by about 0.1 mm, for example. This dimensional tolerance between the inner diameter of the center-side fitting portion 58 and the outer diameter of the pressure-side fitting portion 88 is appropriately set in accordance with the amount of clutch oil intended to be distributed, and is, for example, about 0.1 mm or more and about 0.5 mm or less.

As illustrated in FIGS. 2 and 3, the clutch center 40 includes the center-side cam holes 43H penetrating a portion of the base wall 43. The center-side cam holes 43H extend from portions on the side of the output shaft holding portion 50 to the outer peripheral wall 45. Each center-side cam hole 43H is located between the center-side assist cam surface 60A of the center-side cam portion 60 and the boss 54. When seen in the axial direction of the clutch center 40, the center-side assist cam surface 60A overlaps with a portion of the center-side cam hole 43H.

As illustrated in FIG. 1, the pressure plate 70 is movable toward or away from the clutch center 40 and rotatable relative to the clutch center 40. The pressure plate 70 is configured to press the input-side rotating plates 20 and the output-side rotating plates 22. The pressure plate 70 is positioned coaxially with the clutch center 40 and the clutch housing 30. The pressure plate 70 includes a body 72, and a flange 98 connected to the outer edge of the body 72 on the side of the second direction D2 and extending radially outward. The body 72 projects ahead of the flange 98 in the first direction D1. The flange 98 is located radially outward of a cylindrical portion 80 (see FIG. 4) described later. The pressure plate 70 holds the plurality of output-side rotating plates 22 arranged alternately with the input-side rotating plates 20. The flange 98 is configured to press the input-side rotating plates 20 and the output-side rotating plates 22.

Figure 4:
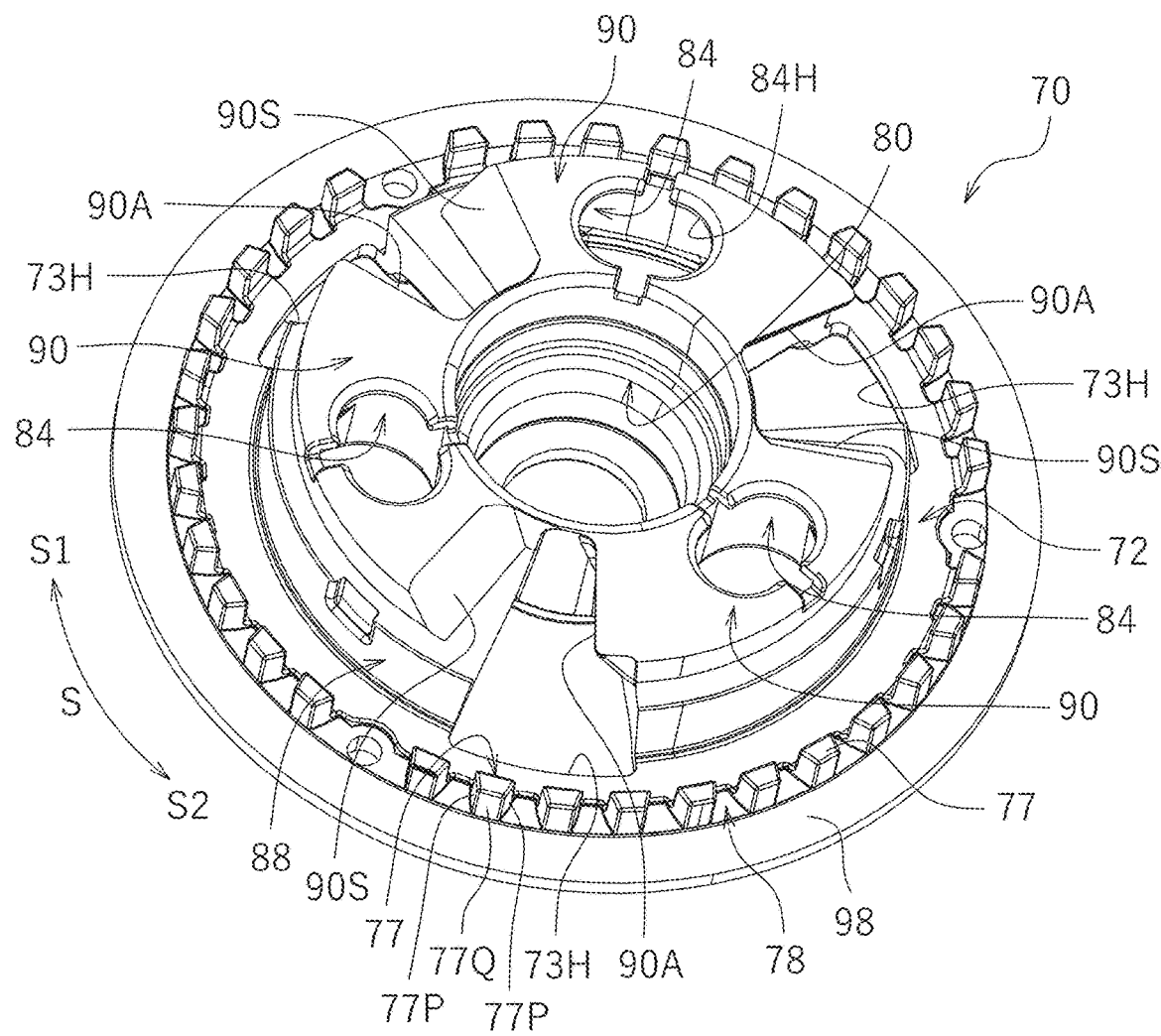
FIG. 4 is a perspective view of a pressure plate according to the first preferred embodiment of the present invention.
Figure 6:
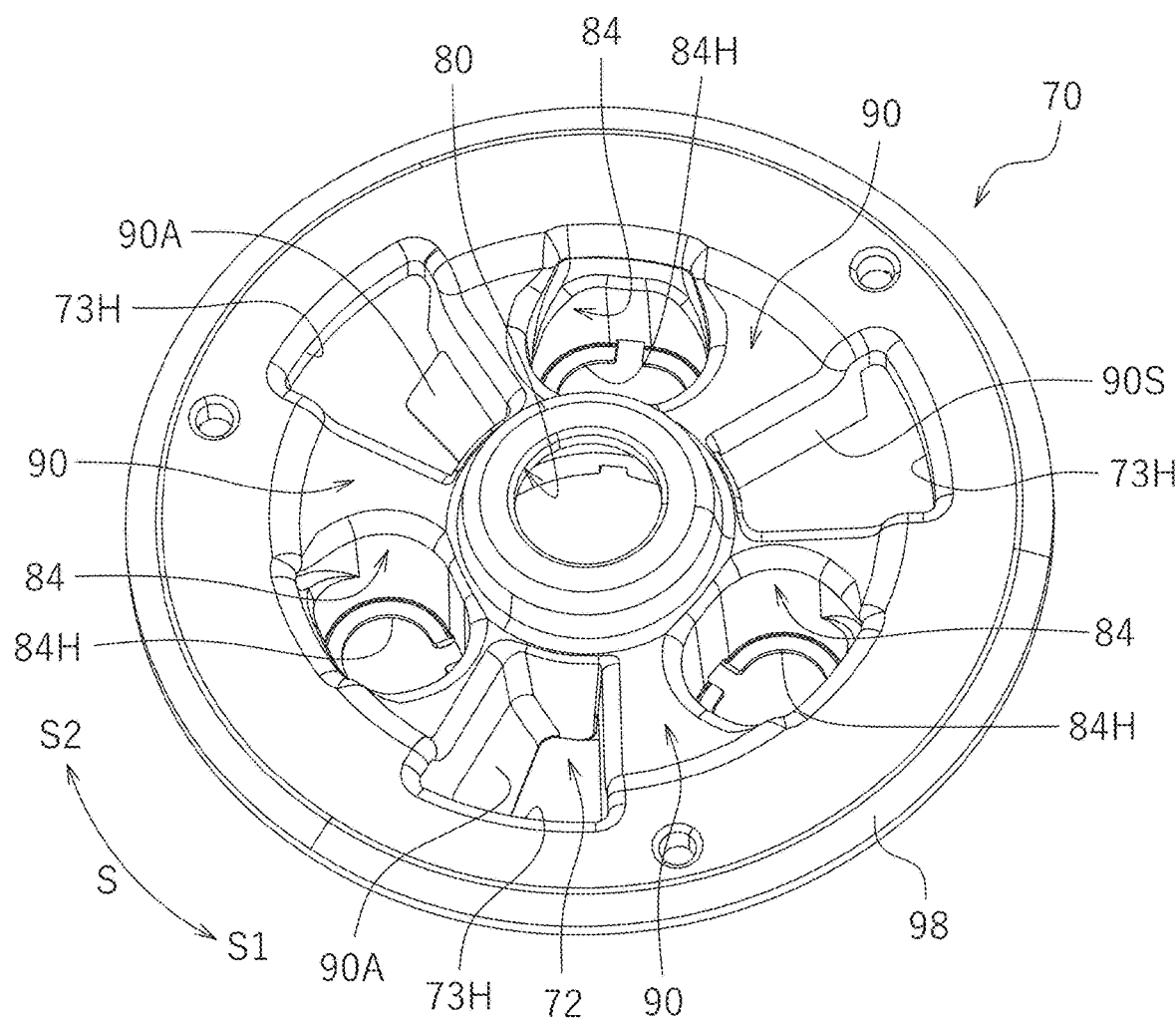
FIG. 6 is a perspective view of a pressure plate according to the first preferred embodiment of the present invention.

As illustrated in FIG. 4, the body 72 includes the cylindrical portion 80, the plurality of pressure-side cam portions 90, the pressure-side fitting portion 88, and a spring housing portion 84 (see also FIG. 6).

The cylindrical portion 80 has a cylindrical or substantially cylindrical shape. The cylindrical portion 80 is integral with the pressure-side cam portions 90. The cylindrical portion 80 houses the distal end 15T of the output shaft 15 (see FIG. 1). The cylindrical portion 80 houses the release bearing 18 (see FIG. 1). The cylindrical portion 80 receives a pressing force from the push member 16B. The cylindrical portion 80 receives clutch oil that has flowed out from the distal end 15T of the output shaft 15.

Figure 5:
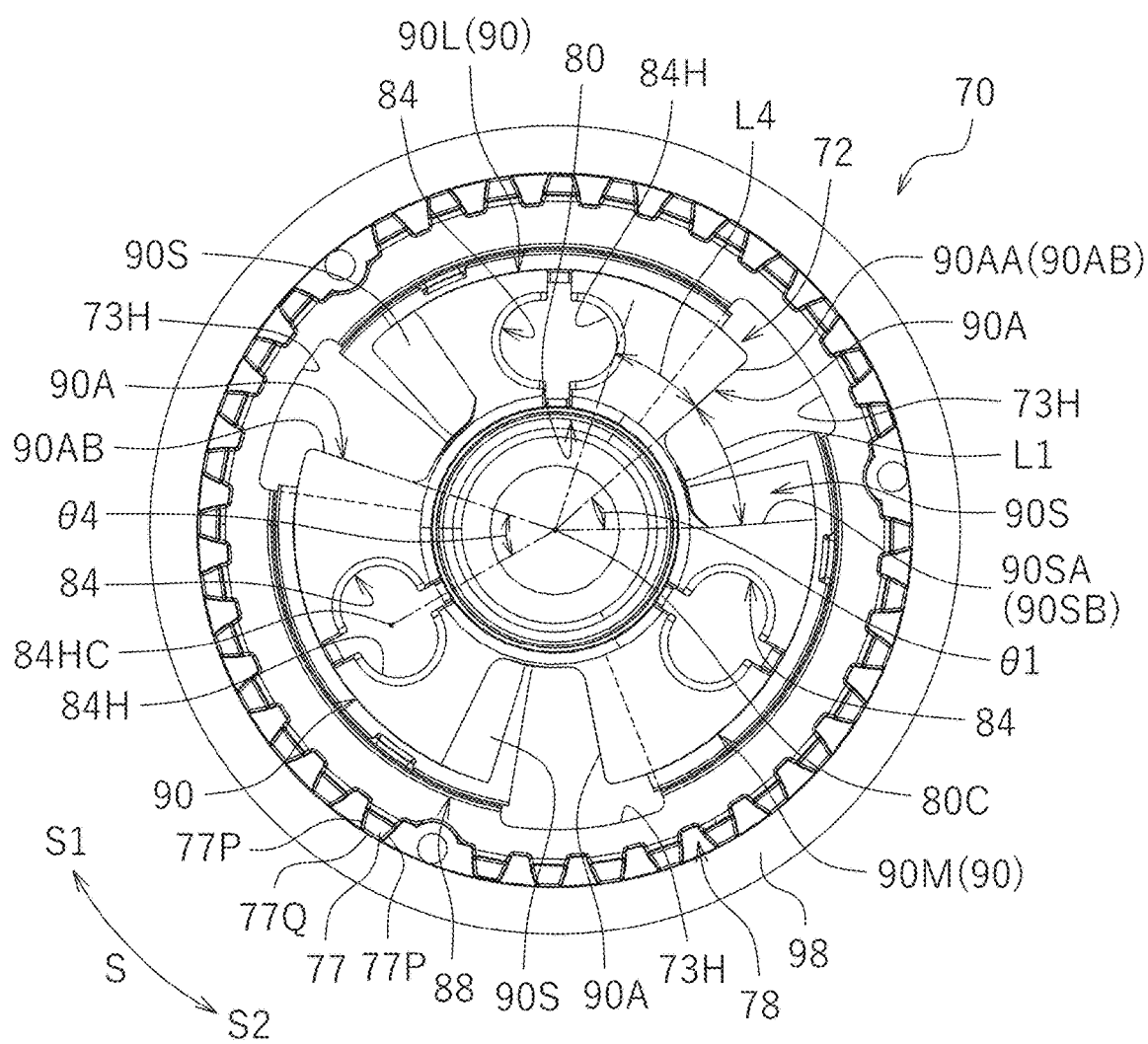
FIG. 5 is a plan view of a pressure plate according to the first preferred embodiment of the present invention.

Each of the pressure-side cam portions 90 preferably has a trapezoidal shape including a cam surface of a slope defining an assist & slipper (registered trademark) mechanism that slides on the center-side cam portions 60 and generates an assist torque or a slipper torque. The pressure-side cam portions 90 project from the flange 98 in the first direction D1. As illustrated in FIG. 5, the pressure-side cam portions 90 are arranged at regular or substantially regular intervals in the circumferential directions S of the pressure plate 70. In this preferred embodiment, the pressure plate 70 includes three pressure-side cam portions 90, but the number of the pressure-side cam portions 90 is not limited to three.

Figure 9:
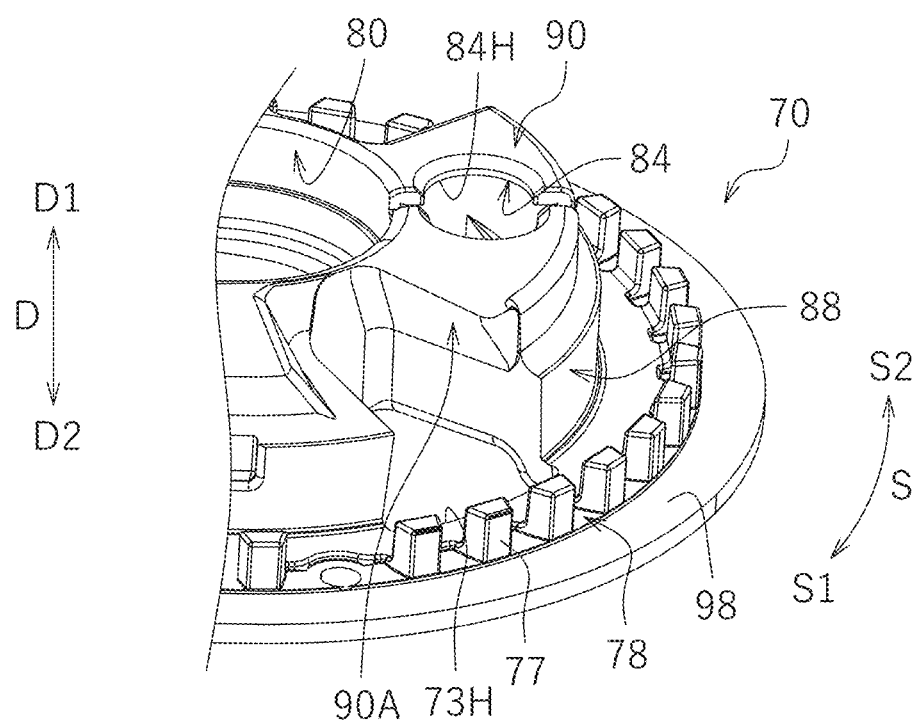
FIG. 9 is an enlarged perspective view of a portion of a pressure plate according to the first preferred embodiment of the present invention.

As illustrated in FIG. 5, the pressure-side cam portion 90 is located radially outward of the cylindrical portion 80. Each of the pressure-side cam portions 90 includes a pressure-side assist cam surface 90A (see also FIGS. 7 and 9) and a pressure-side slipper cam surface 90S. The pressure-side assist cam surface 90A can be brought into contact with the center-side assist cam surface 60A. The pressure-side assist cam surface 90A is configured to generate a force in a direction in which the pressure plate 70 approaches the clutch center 40 in order to increase a pressing force (contact pressure force) between the input-side rotating plates 20 and the output-side rotating plates 22 in relative rotation to the clutch center 40. The pressure-side slipper cam surface 90S can be brought into contact with the center-side slipper cam surface 60S. The pressure-side slipper cam surface 90S is configured to separate the pressure plate 70 from the clutch center 40 in order to reduce a pressing force (contact pressure force) between the input-side rotating plates 20 and the output-side rotating plates 22 in relative rotation to the clutch center 40. In the pressure-side cam portions 90 adjacent to each other in the circumferential directions S, the pressure-side assist cam surface 90A of one pressure-side cam portion 90L and the pressure-side slipper cam surface 90S of the other pressure-side cam portion 90M are opposed to each other in the circumferential directions S.

Figure 8:
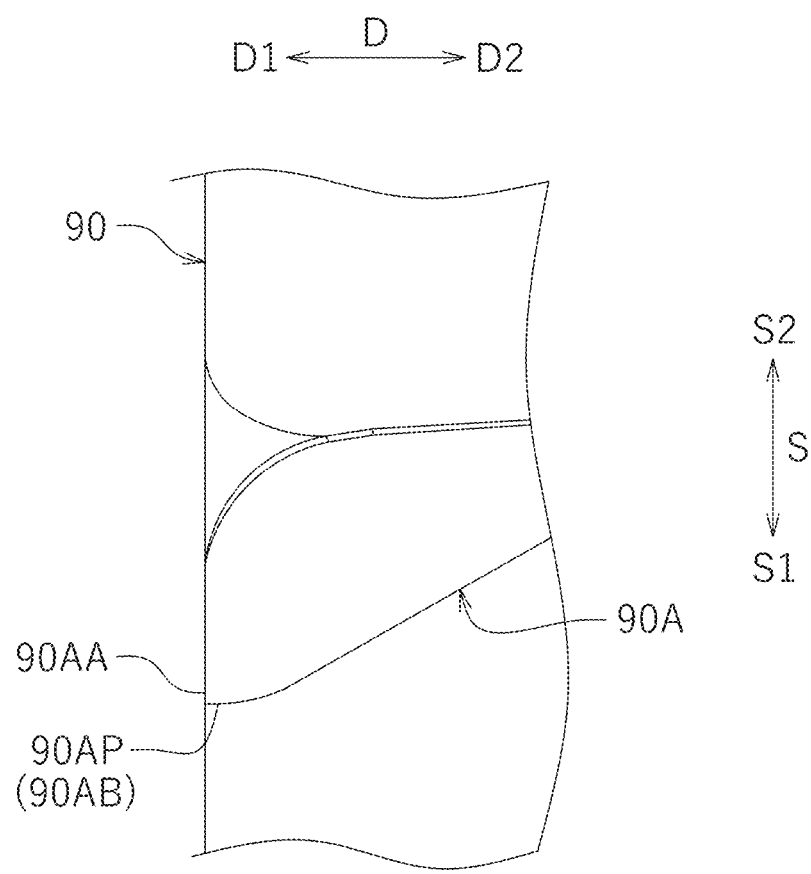
FIG. 8 is an enlarged side view of a portion of a pressure-side cam portion according to the first preferred embodiment of the present invention.

As illustrated in FIG. 8, an end of the pressure-side assist cam surface 90A of each pressure-side cam portion 90 in the circumferential directions S includes a chamfered portion 90AP that is linearly chamfered. A corner of the chamfered portion 90AP (corner on the side of the first direction D1 and the first circumferential direction S1) includes a right angle. More specifically, the chamfered portion 90AP is located in an end 90AB of the pressure-side assist cam surface 90A in the first circumferential direction S1.

Figure 11A:
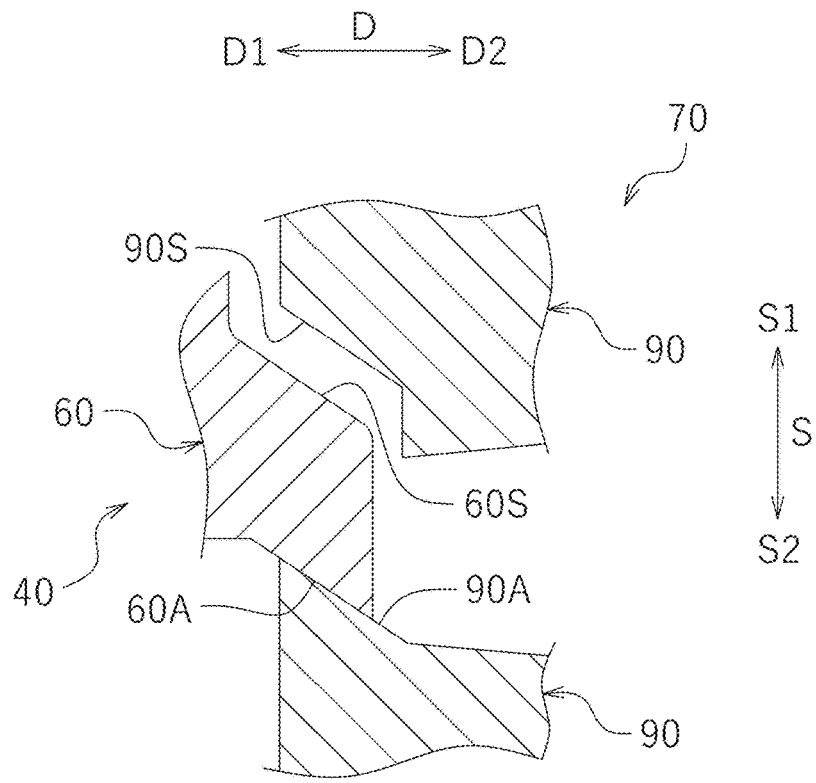
FIG. 11A is a schematic view for describing effects of a center-side assist cam surface and a pressure-side assist cam surface.

Advantages of the center-side cam portions 60 and the pressure-side cam portions 90 will now be described. When the rotation speed of the engine increases so that a rotation driving force input to the input gear 35 and the clutch housing 30 is allowed to be transferred to the output shaft 15 through the clutch center 40, a rotation force in the first circumferential direction S1 is applied to the pressure plate 70, as illustrated in FIG. 11A. Thus, with the effects of the center-side assist cam surface 60A and the pressure-side assist cam surface 90A, a force in first direction D1 is generated in the pressure plate 70. Accordingly, a contact pressure force between the input-side rotating plates 20 and the output-side rotating plates 22 increases.

Figure 11B:
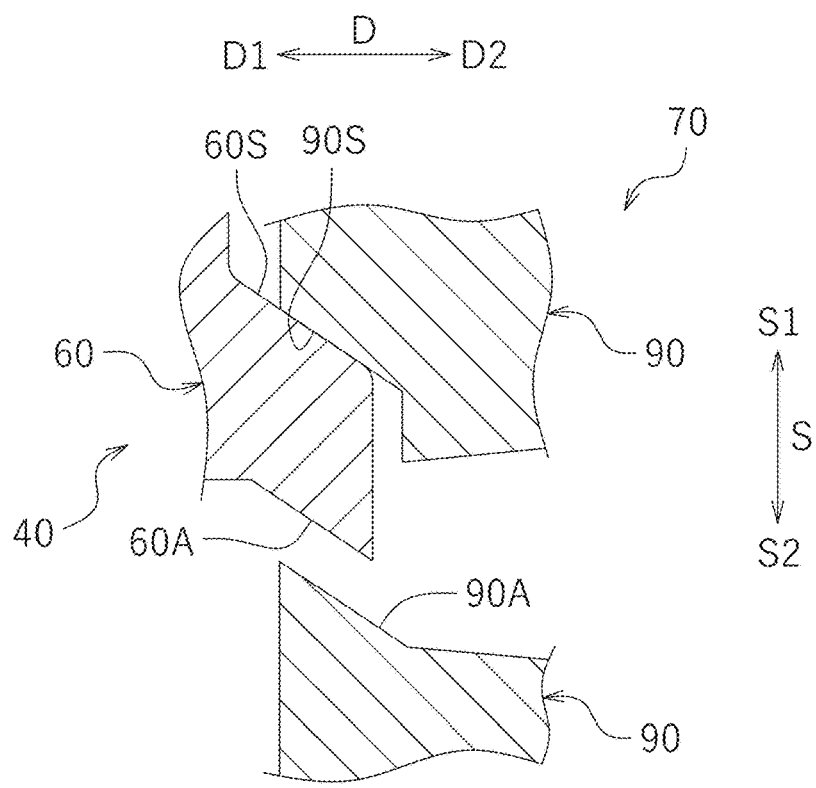
FIG. 11B is a schematic view for describing effects of a center-side slipper cam surface and a pressure-side slipper cam surface.

On the other hand, when the rotation speed of the output shaft 15 exceeds the rotation speed of the input gear 35 and the clutch housing 30 and a back torque is generated, a rotation force in the first circumferential direction S1 is applied to the clutch center 40, as illustrated in FIG. 11B.

Thus, with the effects of the center-side slipper cam surface 60S and the pressure-side slipper cam surface 90S, the pressure plate 70 moves in the second direction D2 and releases a contact pressure force between the input-side rotating plates 20 and the output-side rotating plates 22. In this manner, it is possible to avoid problems in the engine and the transmission caused by the back torque.

As illustrated in FIG. 4, the pressure-side fitting portion 88 is located radially outside of the pressure-side cam portions 90. The pressure-side fitting portion 88 is located ahead of the pressure-side cam portions 90 in the second direction D2. The pressure-side fitting portion 88 is configured to slidably fit in the center-side fitting portion 58 (see FIG. 2).

Figure 7:
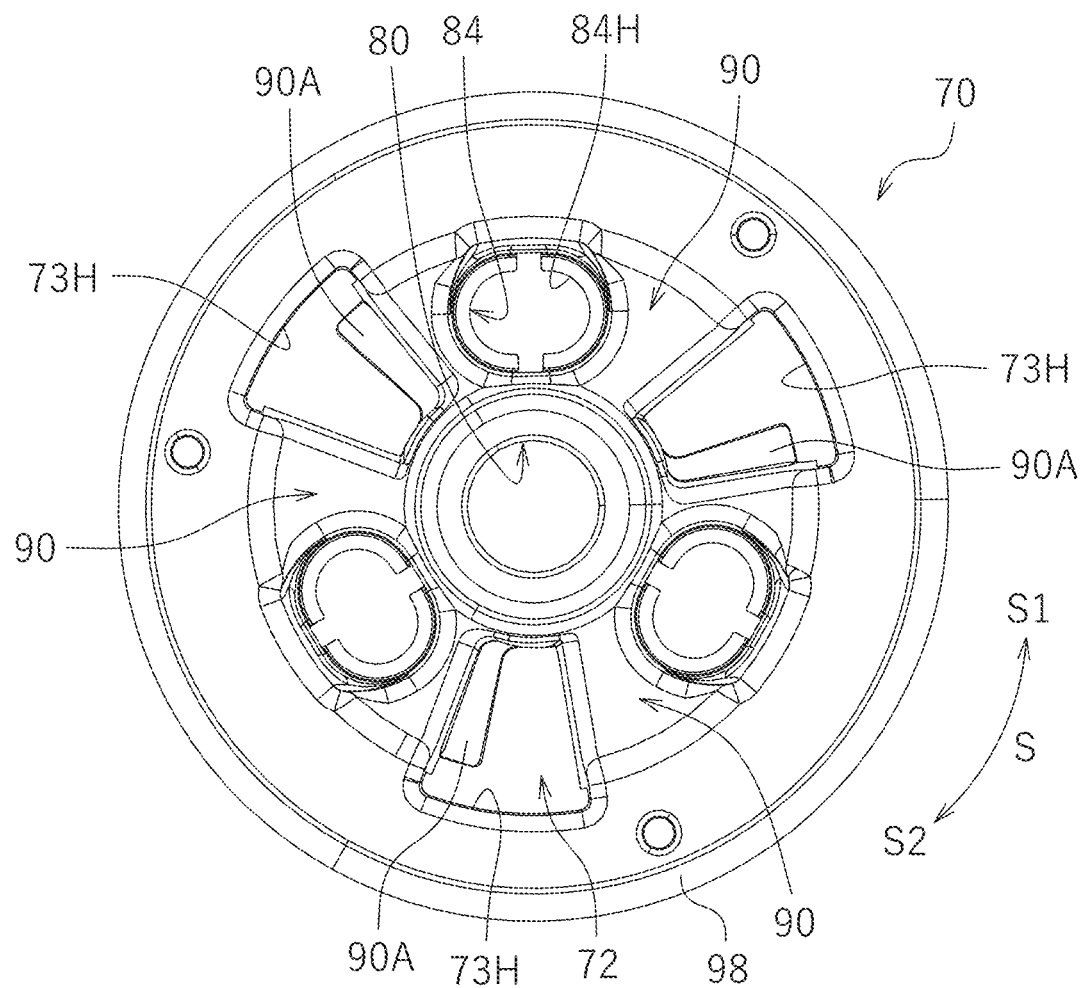
FIG. 7 is a plan view of a pressure plate according to the first preferred embodiment of the present invention.

As illustrated in FIGS. 4 and 5, the pressure plate 70 includes pressure-side cam holes 73H penetrating the body 72 and a portion of the flange 98. The pressure-side cam holes 73H are located radially outward of the cylindrical portion 80. The pressure-side cam holes 73H extend from portions on the side of the cylindrical portion 80 to the radially outside of the pressure-side fitting portion 88. Each of the pressure-side cam holes 73H is located between the pressure-side assist cam surface 90A and the pressure-side slipper cam surface 90S of adjacent ones of the pressure-side cam portions 90. As illustrated in FIGS. 5 and 7, when seen in the axial direction of the pressure plate 70, the pressure-side assist cam surface 90A overlaps with portions of the pressure-side cam holes 73H.

As illustrated in FIG. 4, the pressure plate 70 includes the plurality of pressure-side fitting teeth 77 arranged on the flange 98 and the plurality of through portions 78 between adjacent ones of the pressure-side fitting teeth 77. The pressure-side fitting teeth 77 hold the output-side rotating plates 22. The pressure-side fitting teeth 77 project from the flange 98 in the first direction D1. The pressure-side fitting teeth 77 are located radially outward of the cylindrical portion 80. The pressure-side fitting teeth 77 are located radially outward of the pressure-side cam portions 90. As illustrated in FIG. 5, each of the pressure-side fitting teeth 77 includes a pair of side surfaces 77P extending in the radial directions and a top surface 77Q connecting radially outer ends of the pair of side surfaces 77P. The side face 77P is an example of a second side face. The top surface 77Q is an example of a second top surface. The top surface 77Q extends in the circumferential directions S. In this preferred embodiment, since some of the pressure-side fitting teeth 77 have been removed, the interval between portions corresponding to the removed teeth 77 is enlarged, but the other adjacent pressure-side fitting teeth 77 are arranged at regular or substantially regular intervals. Each of the through portions 78 is located between adjacent ones of the pressure-side fitting teeth 77. The through portion 78 penetrates in the radial directions. The through portion 78 is open in the radial directions and in the first direction D1.

Figure 12:
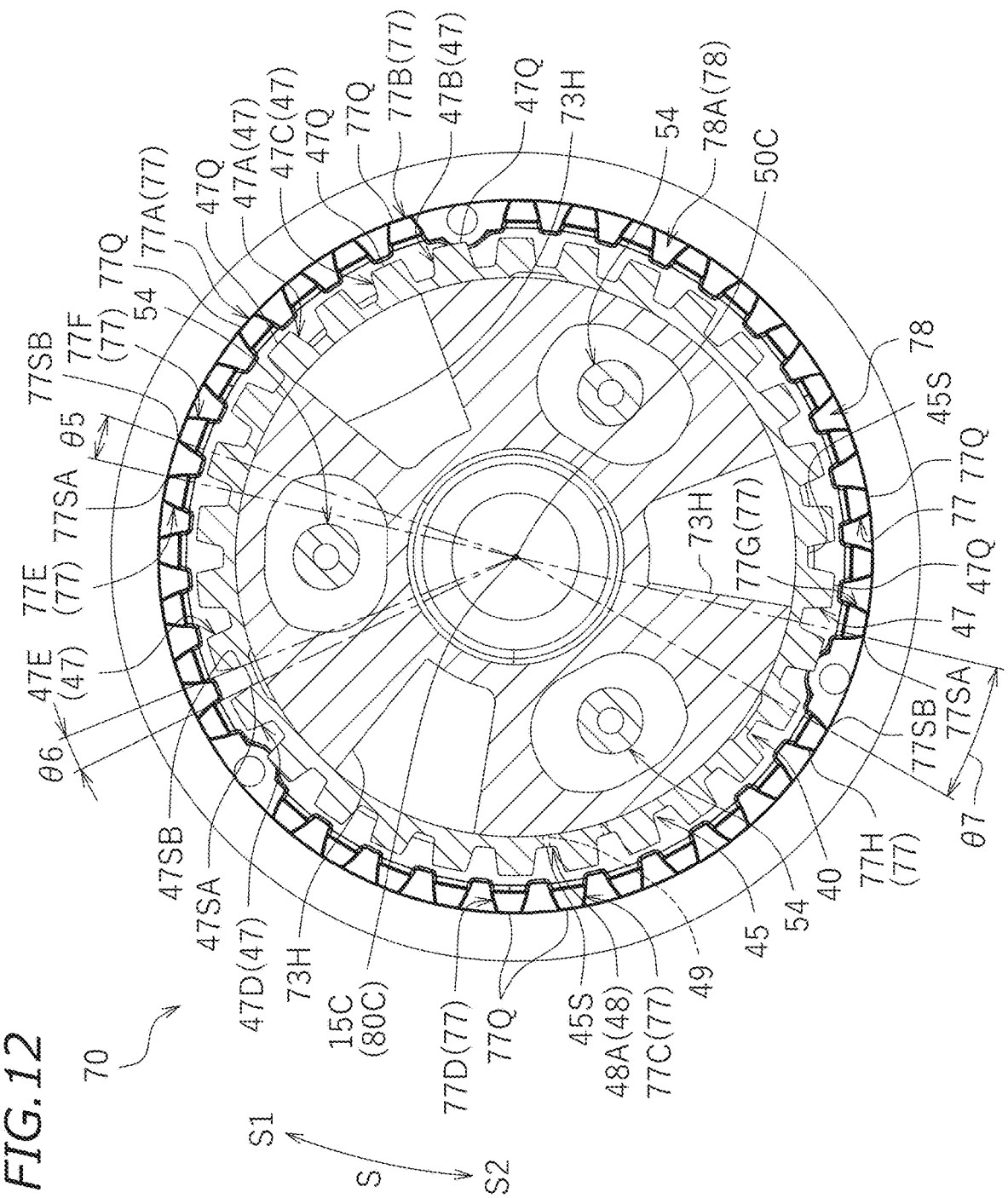
FIG. 12 is a cross-sectional view of a clutch center and a pressure plate according to a preferred embodiment of the present invention.
Figure 13:
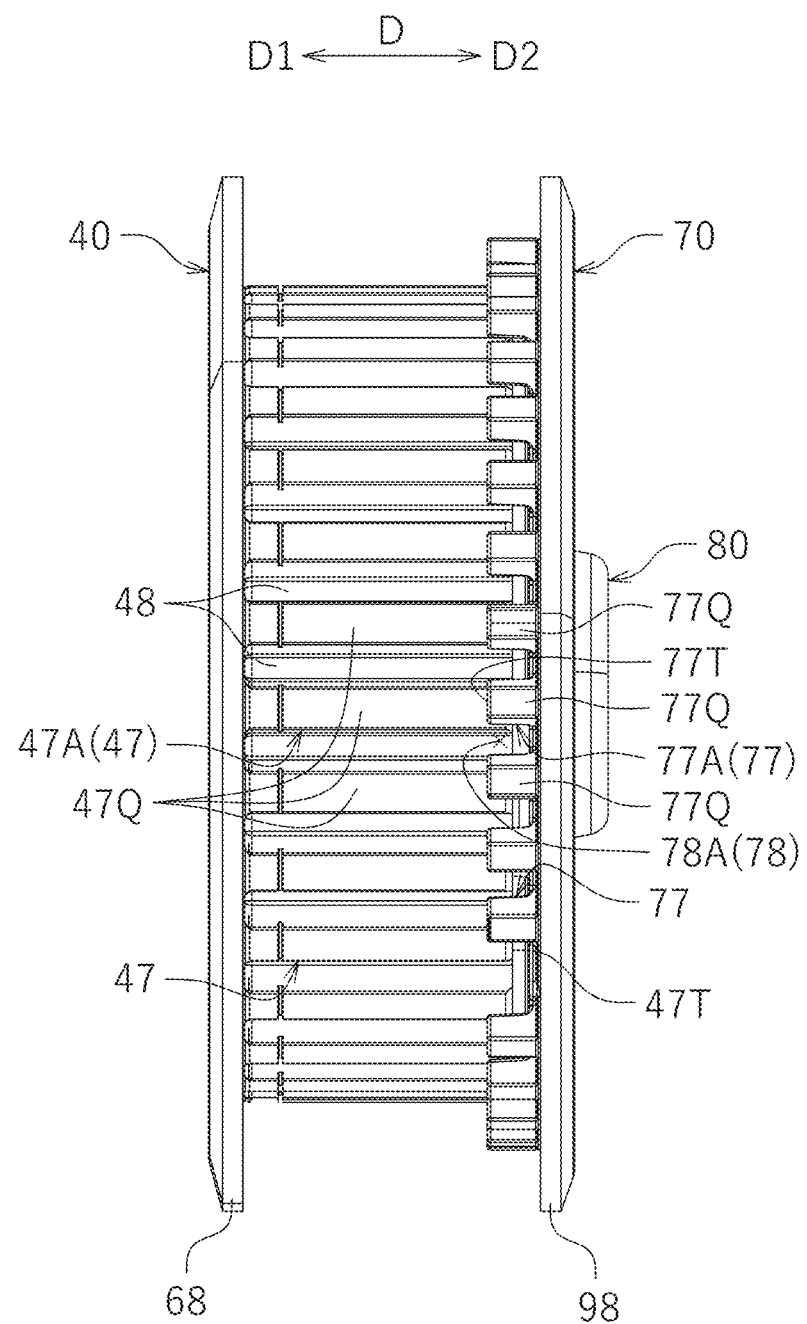
FIG. 13 is a side view of a clutch center and a pressure plate according to a preferred embodiment of the present invention.

As illustrated in FIG. 12, the pressure-side fitting teeth 77 are located radially outward of the center-side fitting teeth 47 to be separated from the center-side fitting teeth 47 in the radial directions of the output shaft 15. A gap is located between the pressure-side fitting teeth 77 and the center-side fitting teeth 47 in the radial directions. As illustrated in FIG. 13, when the center-side assist cam surface 60A and the pressure-side assist cam surface 90A are brought into contact with each other, an end 77T of each of the pressure-side fitting teeth 77 in the first direction D1 is located ahead, in the first direction D1, of an end 47T of the corresponding one of the center-side fitting teeth 47 in the second direction D2. FIGS. 12 through 16 show relationships between the clutch center and the pressure plate, and do not show the input-side rotating plates 20 and the output-side rotating plates 22 for convenience of description. The overlapping state of the pressure-side fitting teeth 77 and the center-side fitting teeth 47 is the same between the state where the input-side rotating plates 20 and the output-side rotating plates 22 are attached to the clutch center 40 and the pressure plate 70 and the state where the input-side rotating plates 20 and the output-side rotating plates 22 are not attached to the clutch center 40 and the pressure plate 70.

As illustrated in FIG. 12, in a normal state of the clutch device 10 (i.e., in a state where the pressure-side assist cam surface 90A and the center-side assist cam surface 60A are in contact with each other), at least portions of some of the plurality of pressure-side fitting teeth 77 overlap with the center-side fitting teeth 47 when seen in the radial directions of the output shaft 15. In this preferred embodiment, the state where the pressure-side fitting teeth 77 and the center-side fitting teeth 47 overlap with each other when seen in the radial directions of the output shaft 15 means that the top surfaces 77Q of the pressure-side fitting teeth 77 overlap with the top surfaces 47Q of the center-side fitting teeth 47 overlap with each other when seen in the radial directions of the output shaft 15. The state where at least portions of the pressure-side fitting teeth 77 overlap with the center-side fitting teeth 47 when seen in the radial directions of the output shaft 15 means that about 50% to about 100%, and preferably about 60% to about 100%, of the area of the top surfaces 77Q of the pressure-side fitting teeth 77 overlaps with the top surfaces 47Q of the center-side fitting teeth 47, for example. Some of the plurality of pressure-side fitting teeth 77 overlap with the center-side fitting teeth 47 in a half or more of the length of the pressure-side fitting teeth 77 in the circumferential directions S, when seen in the radial directions of the output shaft 15. In this preferred embodiment, the length of each of the top surfaces 47Q in the circumferential directions S is longer than the length of each of the top surfaces 77Q in the circumferential directions S. For example, a pressure-side fitting tooth 77A, which is one of the pressure-side fitting teeth 77, overlaps with a center-side fitting teeth 47A in the entire length of the pressure-side fitting tooth 77A in the circumferential directions S, when seen in the radial directions of the output shaft 15. Further, in the normal state of the clutch device 10, at least a portion of at least one through portion 78A of the plurality of through portions 78 overlaps the center-side fitting teeth 47 when seen in the radial directions of the output shaft 15. Further, in the normal state of the clutch device 10, among the plurality of pressure-side fitting teeth 77, the top surfaces 77Q of some of the pressure-side fitting teeth 77 at least partially overlap the top surfaces 47Q of the center-side fitting teeth 47 When seen in the radial directions of the output shaft 15.

As illustrated in FIG. 12, in the normal state of the clutch device 10, at least portions of other pressure-side fitting teeth 77 of the plurality of pressure-side fitting teeth 77 do not overlap with the center-side fitting teeth 47 when seen in the radial directions of the output shaft 15. In this preferred embodiment, the state where the pressure-side fitting teeth 77 and the center-side fitting teeth 47 do not overlap with each other when seen in the radial directions of the output shaft 15 means, for example, that the top surfaces 77Q of the pressure-side fitting teeth 77 do not overlap with the top surfaces 47Q of the center-side fitting teeth 47 when seen in the radial directions of the output shaft 15. The state where at least portions of the pressure-side fitting teeth 77 do not overlap with the center-side fitting teeth 47 when seen in the radial directions of the output shaft 15 means that about 50% to about 100%, preferably about 60% to about 100%, of the area of the top surfaces 77Q of the pressure-side fitting teeth 77 does not overlap with the top surfaces 47Q of the center-side fitting teeth 47, for example. Other pressure-side fitting teeth 77 of the plurality of pressure-side fitting teeth 77 do not overlap with the center-side fitting teeth 47 in a half or more of the length of the pressure-side fitting teeth 77 in the circumferential directions S, when seen in the radial directions of the output shaft 15. For example, a pressure-side fitting tooth 77B, which is one of the pressure-side fitting teeth 77, does not overlap with a center-side fitting teeth 47B and a center-side fitting teeth 47C in a half or more of the length of the pressure-side fitting tooth 77B in the circumferential directions S, when seen in the radial directions of the output shaft 15. Further, in the normal state of the clutch device 10, at least a portion of the top surfaces 77Q of other pressure-side fitting teeth 77 of the plurality of pressure-side fitting teeth 77 do not overlap with the top surfaces 47Q of the center-side fitting teeth 47 when seen in the radial directions of the output shaft 15.

Figure 14:
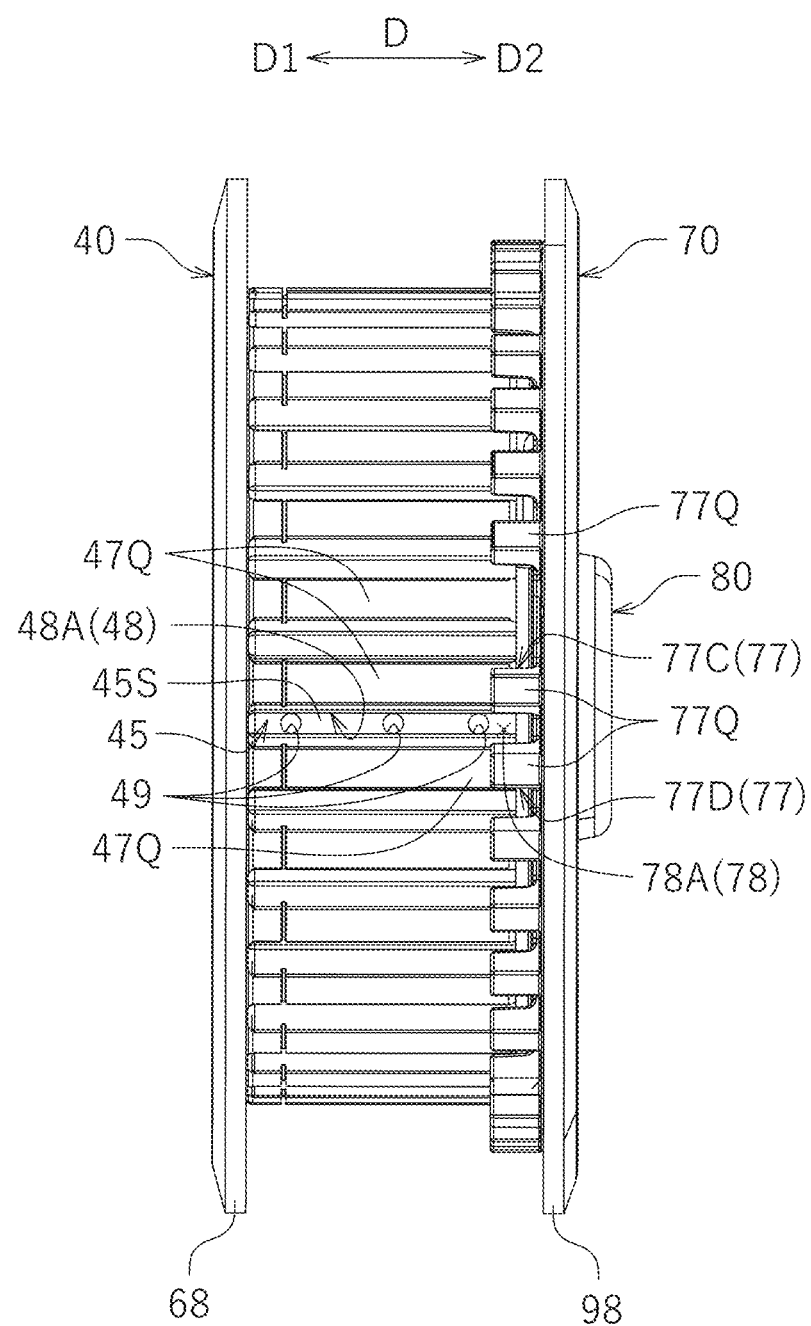
FIG. 14 is a side view of the clutch center and the pressure plate when a pressure-side slipper cam surface and a center-side slipper cam surface are brought into contact with each other.

As illustrated in FIG. 14, in the state where the pressure-side slipper cam surface 90S and the center-side slipper cam surface 60S are in contact with each other, at least portions of some pressure-side fitting teeth 77 (e.g., the top surfaces 77Q of the pressure-side fitting teeth 77) of the plurality of pressure-side fitting teeth 77 overlap with the center-side fitting teeth 47 (e.g., the top surfaces 47Q of the center-side fitting teeth 47) when seen in the radial directions of the output shaft 15, and at least portions of other pressure-side fitting teeth 77 (e.g., the top surfaces 77Q of the pressure-side fitting teeth 77) of the plurality of pressure-side fitting teeth 77 do not overlap with the center-side fitting teeth 47 (e.g., the top surfaces 47Q of the center-side fitting teeth 47) when seen in the radial directions of the output shaft 15. Further, in the state where the pressure-side slipper cam surface 90S and the center-side slipper cam surface 60S are in contact with each other, at least a portion of at least one through portion 78A of the plurality of through portions 78 overlaps with the center-side fitting teeth 47 when seen in the radial directions of the output shaft 15. Further, in the state where the pressure-side slipper cam surface 90S and the center-side slipper cam surface 60S are in contact with each other, at least a portion of the top surfaces 77Q of some pressure-side fitting teeth 77 of the plurality of pressure-side fitting teeth 77 overlap with the center-side fitting teeth 47 when seen in the radial directions of the output shaft 15, and at least a portion of the top surfaces 77Q of other pressure-side fitting teeth 77 of the plurality of pressure-side fitting teeth 77 do not overlap with the center-side fitting teeth 47 when seen in the radial directions of the output shaft 15.

Figure 15:
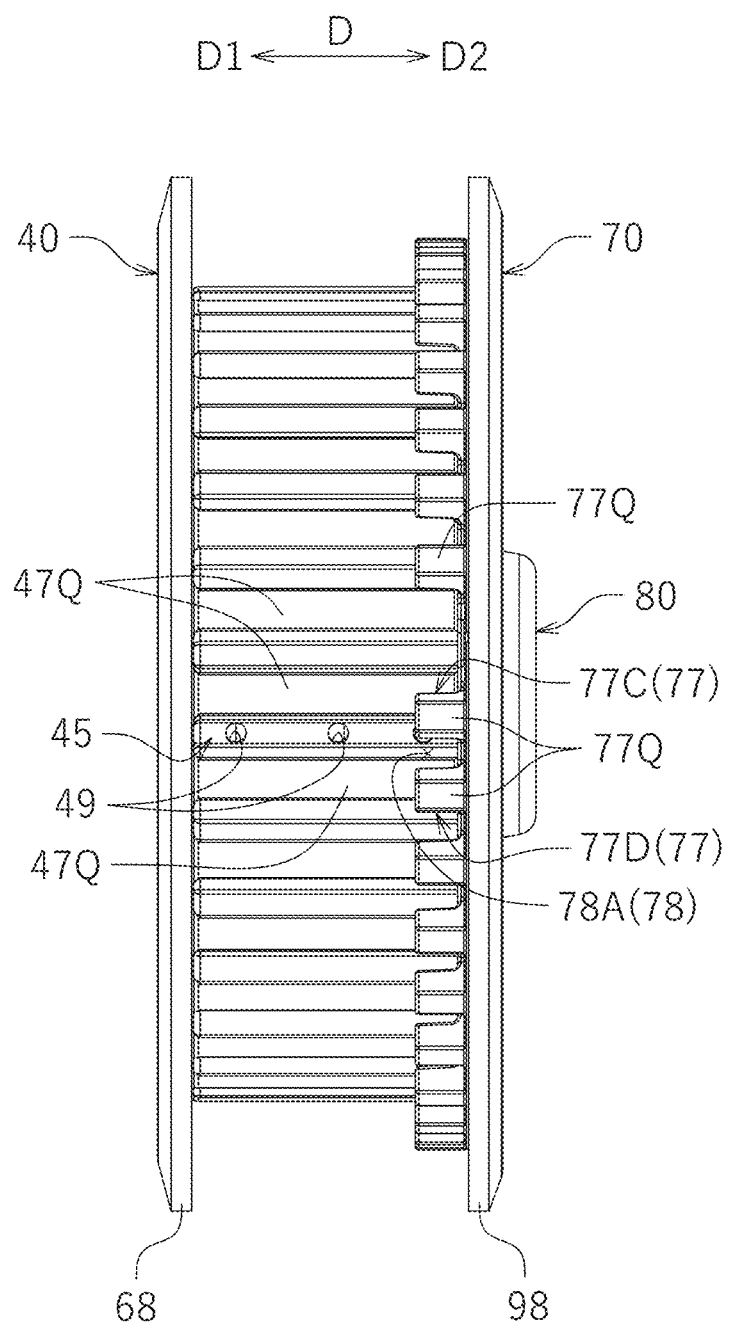
FIG. 15 is a side view of the clutch center and the pressure plate while the pressure-side slipper cam surface and the center-side slipper cam surface are not in contact with each other and the pressure-side assist cam surface and the center-side assist cam surface are not in contact with each other.

When the pressure plate 70 approaches the clutch center 40 by a predetermined distance from the state illustrated in FIG. 14, the pressure-side slipper cam surface 90S and the center-side slipper cam surface 60S do not contact each other, and the pressure-side assist cam surface 90A and the center-side assist cam surface 60A do not contact with each other (see FIG. 15). As illustrated in FIG. 15, in the state where the pressure-side slipper cam surface 90S and the center-side slipper cam surface 60S are not in contact with each other and the pressure-side assist cam surface 90A and the center-side assist cam surface 60A are not in contact with each other, at least portions of some pressure-side fitting teeth 77 (e.g., the top surfaces 77Q of the pressure-side fitting teeth 77) of the plurality of pressure-side fitting teeth 77 overlap with the center-side fitting teeth 47 (e.g., the top surfaces 47Q of the center-side fitting teeth 47) when seen in the radial directions of the output shaft 15, and at least portions of other pressure-side fitting teeth 77 (e.g., the top surfaces 77Q of the pressure-side fitting teeth 77) of the plurality of pressure-side fitting teeth 77 do not overlap with the center-side fitting teeth 47 (e.g., the top surfaces 47Q of the center-side fitting teeth 47) when seen in the radial directions of the output shaft 15. Further, in the state where the pressure-side slipper cam surface 90S and the center-side slipper cam surface 60S are not in contact with each other and the pressure-side assist cam surface 90A and the center-side assist cam surface 60A are not in contact with each other, at least a portion of at least one through portion 78A of the plurality of through portions 78 overlaps with the center-side fitting teeth 47 when seen in the radial directions of the output shaft 15. Further, in the state where the pressure-side slipper cam surface 90S and the center-side slipper cam surface 60S are not in contact with each other and the pressure-side assist cam surface 90A and the center-side assist cam surface 60A are not in contact with each other, at least a portion of the top surfaces 77Q of some pressure-side fitting teeth 77 of the plurality of pressure-side fitting teeth 77 overlap with the center-side fitting teeth 47 when seen in the radial directions of the output shaft 15, and at least a portion of the top surfaces 77Q of other pressure-side fitting teeth 77 of the plurality of pressure-side fitting teeth 77 do not overlap with the center-side fitting teeth 47 when seen in the radial directions of the output shaft 15.

Figure 16:
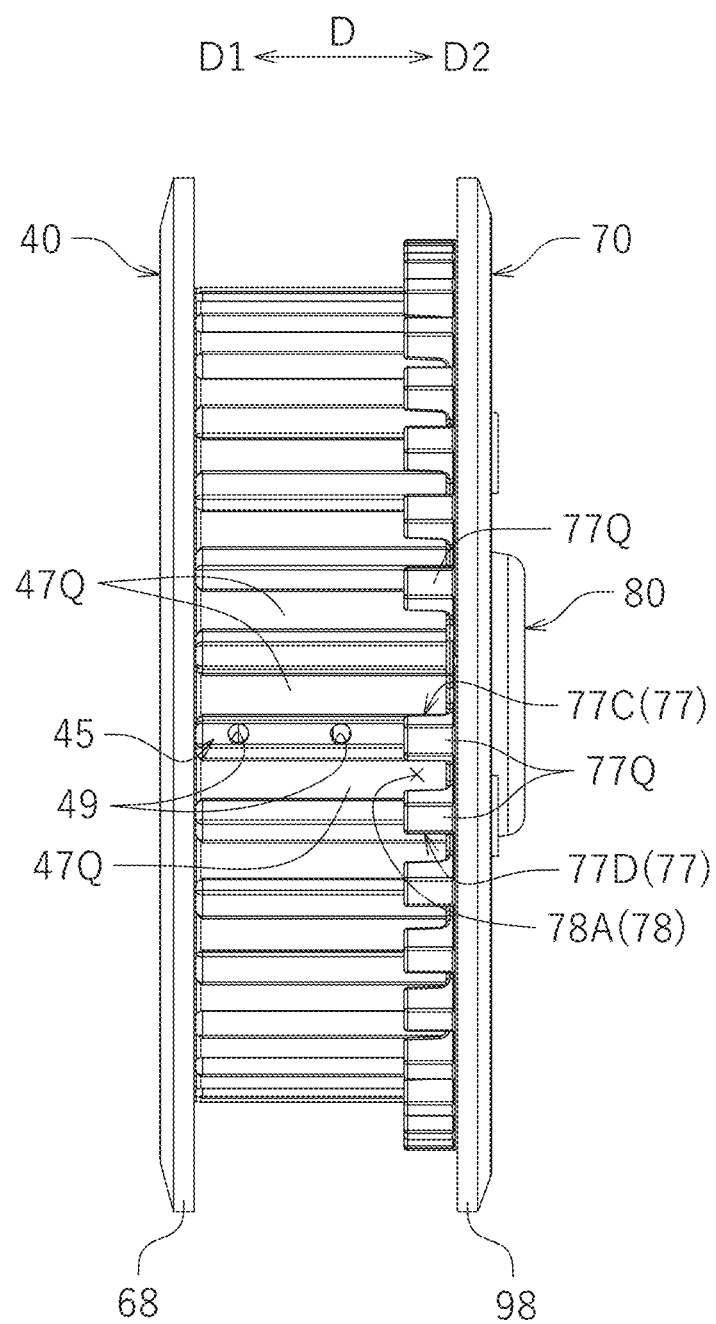
FIG. 16 is a side view of the clutch center and the pressure plate when the pressure-side assist cam surface and the center-side assist cam surface are brought into contact with each other.

When the pressure plate 70 further approaches the clutch center 40 by a predetermined distance from the state illustrated in FIG. 15, the pressure-side assist cam surface 90A and the center-side assist cam surface 60A are brought into contact with each other (see FIG. 16). As illustrated in FIG. 16, in the state where the pressure-side assist cam surface 90A and the center-side assist cam surface 60A are in contact with each other (i.e., the normal state), at least portions of some pressure-side fitting teeth 77 (e.g., the top surfaces 77Q of the pressure-side fitting teeth 77) of the plurality of pressure-side fitting teeth 77 overlap with the center-side fitting teeth 47 (e.g., the top surfaces 47Q of the center-side fitting teeth 47) when seen in the radial directions of the output shaft 15, and at least portions of other pressure-side fitting teeth 77 (e.g., the top surfaces 77Q of the pressure-side fitting teeth 77) of the plurality of pressure-side fitting teeth 77 do not overlap with the center-side fitting teeth 47 (e.g., the top surfaces 47Q of the center-side fitting teeth 47) when seen in the radial directions of the output shaft 15.

As illustrated in FIG. 12, in the normal state of the clutch device 10, at least portions of the spline grooves 48 including the oil flow holes 49 do not overlap with the pressure-side fitting teeth 77 when seen in the radial directions of the output shaft 15. In this preferred embodiment, the state where the spline grooves 48 including the oil flow holes 49 do not overlap with the pressure-side fitting teeth 77 when seen in the radial directions of the output shaft 15 means, for example, that portions of the top surfaces 77Q of the pressure-side fitting teeth 77 and a portion of an outer peripheral surface 45S of the outer peripheral wall 45 including the oil flow holes 49 do not overlap with each other when seen in the radial directions of the output shaft 15. The state where portions of the spline grooves 48 do not overlap with the pressure-side fitting teeth 77 when seen in the radial directions of the output shaft 15 means that about 50% to about 100%, preferably about 60% to about 100%, of the area of the top surfaces 77Q of the pressure-side fitting teeth 77 does not overlap with the outer peripheral surface 45S of the outer peripheral wall 45, for example. As illustrated in FIGS. 12 and 14, for example, about 60% of the spline grooves 48A does not overlap with the pressure-side fitting teeth 77C and the pressure-side fitting teeth 77D when seen in the radial directions of the output shaft 15, for example.

As illustrated in FIGS. 6 and 7, the spring housing portions 84 are located in the pressure-side cam portions 90. The spring housing portions 84 are recessed from the second direction D2 to the first direction D1. Each of the spring housing portions 84 has an oval or substantially oval shape. The spring housing portions 84 house pressure springs 25 (see FIG. 1). The spring housing portions 84 include the insertion holes 84H which penetrate the spring housing portions 84 and in which the bosses 54 (see FIG. 2) are inserted. That is, the insertion holes 84H penetrate the pressure-side cam portions 90. Each of the insertion holes 84H has an oval or substantially oval shape.

As illustrated in FIG. 1, the pressure springs 25 are housed in the spring housing portions 84. The pressure springs 25 are held by the bosses 54 inserted in the insertion holes 84H of the spring housing portions 84. The pressure springs 25 bias the pressure plate 70 toward the clutch center 40 (i.e., in the first direction D1). The pressure springs 25 are, for example, coil springs obtained by helically winding spring steel.

Figure 10:
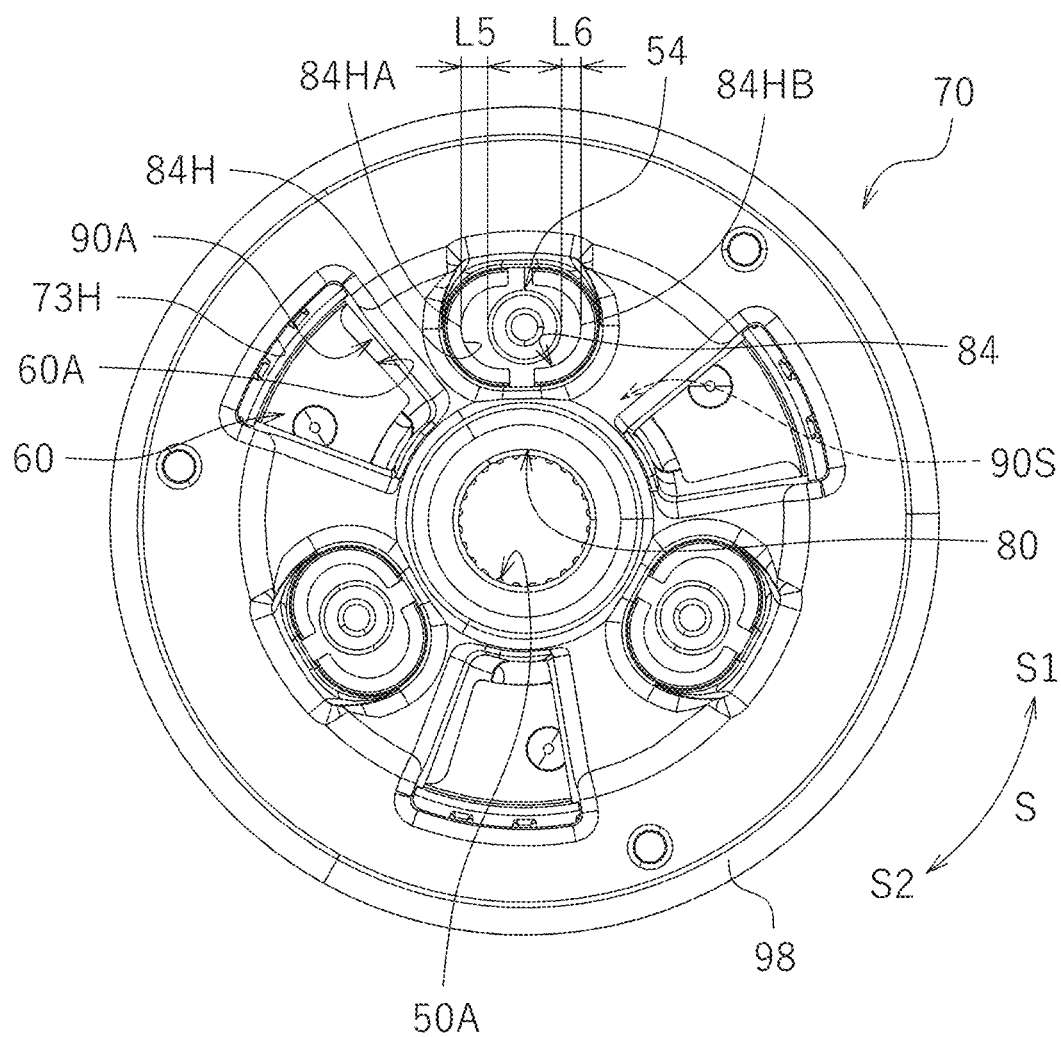
FIG. 10 is a plan view illustrating a state where a clutch center according to the first preferred embodiment of the present invention and a pressure plate are combined.

FIG. 10 is a plan view illustrating a state where the clutch center 40 and the pressure plate 70 are combined. In the state illustrated in FIG. 10, the pressure-side assist cam surface 90A and the center-side assist cam surface 60A do not contact each other, and the pressure-side slipper cam surface 90S and the center-side slipper cam surface 60S do not contact each other. At this time, the pressure plate 70 is closest to the clutch center 40. This state will be referred to as a normal state of the clutch device 10. As illustrated in FIG. 10, a distance L5 in the circumferential directions S between the boss 54 and an end 84HA of the insertion holes 84H toward the pressure-side assist cam surface 90A (i.e., ahead in the first circumferential direction S1) in the normal state is smaller than a distance L6 in the circumferential direction S between the boss 54 and an end 84HB of the insertion holes 84H toward the pressure-side slipper cam surface 90S (i.e., ahead in the second circumferential direction S2) in the normal state.

As illustrated in FIG. 1, the stopper plate 100 can contact the pressure plate 70. The stopper plate 100 reduces or prevents separation of the pressure plate 70 from the clutch center 40 by a predetermined distance or more in the second direction D2. The stopper plate 100 is fixed to the bosses 54 of the clutch center 40 with the bolts 28. The pressure plate 70 is fixed by fastening the bolts 28 to the bosses 54 through the stopper plate 100 with the bosses 54 and the pressure springs 25 of the clutch center 40 located in the spring housing portions 84. The stopper plate 100 is triangular or substantially triangular in plan view.

When the pressure plate 70 is brought into contact with the stopper plate 100, the pressure-side slipper cam surface 90S and the center-side slipper cam surface 60S are in contact with each other in an area of about 50% or more and about 90% or less of the area of the pressure-side slipper cam surface 90S and about 50% or more and about 90% or less of the area of the center-side slipper cam surface 60S, for example. When the pressure plate 70 is brought into contact with the stopper plate 100, the pressure springs 25 are separated from the side walls of the spring housing portions 84. That is, the pressure springs 25 are not sandwiched between the bosses 54 and the spring housing portions 84, and application of excessive stress to the bosses 54 is reduced or prevented.

Here, a length L1 in the circumferential directions S (see FIG. 5) from the end 90AA of the pressure-side assist cam surface 90A in the first direction D1 of one pressure-side cam portion 90L located on the side of the first circumferential direction S1 in the pressure-side cam portions 90 adjacent to each other in the circumferential directions S to an end 90SA of the pressure-side slipper cam surface 90S in the first direction D1 of the other pressure-side cam portion 90M located on the side of the second circumferential direction S2 is larger than a length L2 in the circumferential directions (see FIG. 3) from an end 60AA of the center-side assist cam surface 60A in the second direction D2 to the end 60SA of the center-side slipper cam surface 60S in the second direction D2 in one center-side cam portion 60.

When seen in the axial directions of the output shaft 15, an angle θ1 (see FIG. 5) defined by a center of the pressure plate 70 (i.e., a center 80C of the cylindrical portion 80), the end 90AB of the pressure-side assist cam surface 90A in the first circumferential direction S1 located on the side of the first circumferential direction S1 of one pressure-side cam portion 90L in the pressure-side cam portions 90 adjacent to each other in the circumferential directions S, and the end 90SB of the pressure-side slipper cam surface 90S in the first circumferential direction S1 located on the side of the second circumferential direction S2 of the other pressure-side cam portion 90M is larger than an angle θ2 (see FIG. 3) defined by a center 50C of the output shaft holding portion 50, the end 60AB of the center-side assist cam surface 60A in the second circumferential direction S2, and the end 60SB of the center-side slipper cam surface 60S in the second circumferential direction S2 in one center-side cam portion 60. The angle θ1 is defined a straight line passing through the center 80C of the cylindrical portion 80 and the end 90AB and a straight line passing through the center 80C and the end 90SB. The angle θ2 is defined by a straight line passing through the center 50C of the output shaft holding portion 50 and the end 60AB and a straight line passing through the center 50C and the end 60SB.

A length L3 in the circumferential directions S (see FIG. 3) from the end 60AA of the center-side assist cam surface 60A in the second direction D2 to the boss 54 is larger than a length L4 in the circumferential directions S (see FIG. 5) from the end 90AA of the pressure-side assist cam surface 90A in the first direction D1 to the insertion hole 84H.

When seen in the axial directions of the output shaft 15, an angle θ3 (see FIG. 3) defined by the center 50C of the output shaft holding portion 50, the end 60AB in the second circumferential direction S2 of the center-side assist cam surface 60A of the center-side cam portion 60, and a center 54C of the boss 54 is larger than an angle θ4 (see FIG. 5) defined by the center of the pressure plate 70 (i.e., the center 80C of the cylindrical portion 80 in this preferred embodiment), the end 90AB of the pressure-side assist cam surface 90A in the first circumferential direction S1, and a center 84HC of the insertion hole 84H. The angle θ3 is defined by a straight line passing through the center 50C of the output shaft holding portion 50 and the end 60AB and a straight line passing through the center 50C and the center 54C of the boss 54. The angle θ4 is defined by a straight line passing through the center 80C of the cylindrical portion 80 and the end 90AB and a straight line passing through the center 80C and a center 84HC of the through hole 84H.

As illustrated in FIG. 12, when seen in the axial directions (i.e., directions D) of the output shaft 15, a minimum angle θ5 defined by a straight line passing through the center 80C of the cylindrical portion 80 (i.e., the center 15C of the output shaft 15) and an end 77SA of one pressure-side fitting tooth 77E at the side of the first circumferential direction S1 in the pressure-side fitting teeth 77 adjacent to each other in the circumferential directions S and a straight line passing through the center 80C of the cylindrical portion 80 and an end 77SB of another pressure-side fitting tooth 77F at the side of the second circumferential direction S2 in the pressure-side fitting teeth 77 adjacent to each other in the circumferential directions S is larger than an angle θ6 defined by a straight line passing through the center 50C of the output shaft holding portion 50 and an end 47SA of one center-side fitting tooth 47D at the side of the first circumferential direction S1 in the center-side fitting teeth 47 adjacent to each other in the circumferential directions S and a straight line passing through the center 50C of the output shaft holding portion 50 and an end 47SB of another center-side fitting tooth 47E at the side of the second circumferential direction S2 in the center-side fitting teeth 47 adjacent to each other in the circumferential directions S. The angle θ5 may be smaller than the angle θ6. In this preferred embodiment, since some pressure-side fitting teeth 77 have been removed, an angle θ7 defined by a straight line passing through the center 80C of the cylindrical portion 80 and an end 77SA of one pressure-side fitting tooth 77G at the side of the first circumferential direction S1 in the pressure-side fitting teeth 77 adjacent to each other in the circumferential directions S and a straight line passing through the center 80C of the cylindrical portion 80 and an end 77SB of another pressure-side fitting tooth 77H at the side of the second circumferential direction S2 in the pressure-side fitting teeth 77 adjacent to each other in the circumferential directions S is larger than the angles θ5 and θ6.

The clutch device 10 is filled with a predetermined amount of clutch oil. Clutch oil is distributed in the clutch center 40 and the pressure plate 70 through the hollow portion 15H of the output shaft 15, and then is supplied to the input-side rotating plates 20 and the output-side rotating plates 22 through the gap between the center-side fitting portion 58 and the pressure-side fitting portion 88 and the oil flow holes 49. Clutch oil reduces or prevents absorption of heat and abrasion of the friction members. The clutch device 10 according to this preferred embodiment is a so-called multiplate wet friction clutch device.

Operation of the clutch device 10 according to this preferred embodiment will now be described. As described above, the clutch device 10 is between the engine and the transmission of the motorcycle, and allows or interrupts transfer of a rotation driving force of the engine to the transmission by driver's operation of a clutch operation lever.

In the clutch device 10, in a case where the driver of the motorcycle does not operate the clutch operation lever, a clutch release mechanism (not shown) does not press the push rod 16A, and thus, the pressure plate 70 presses the input-side rotating plates 20 with a biasing force (elastic force) of the pressure springs 25. Accordingly, the clutch center 40 enters a clutch-ON state in which the input-side rotating plates 20 and the output-side rotating plates 22 are pushed against each other to be friction coupled, and is rotationally driven. That is, a rotation driving force of the engine is transferred to the clutch center 40, and the output shaft 15 is rotationally driven.

In the clutch-ON state, clutch oil distributed in the hollow portion H of the output shaft 15 and having flowed out from the distal end 15T of the output shaft 15 is dropped or spattered in the cylindrical portion 80 and attached to the cylindrical portion 80 (see arrow F in FIG. 1). The clutch oil attached to the inside of the cylindrical portion 80 is guided into the clutch center 40. Accordingly, clutch oil flows out of the clutch center 40 through the oil flow holes 49. Clutch oil also flows out of the clutch center 40 through the gap between the center-side fitting portion 58 and the pressure-side fitting portion 88. Then, clutch oil that has flowed out of the clutch center 40 is supplied to the input-side rotating plates 20 and the output-side rotating plates 22.

On the other hand, in the clutch device 10, when the driver of the motorcycle operates the clutch operation lever in the clutch-ON state, the clutch release mechanism (not shown) presses the push rod 16A, and thus, the pressure plate 70 is displaced in a direction away from the clutch center 40 (second direction D2) against a biasing force of the pressure springs 25. Accordingly, the clutch center 40 enters a clutch-OFF state in which friction coupling between the input-side rotating plates 20 and the output-side rotating plates 22 is canceled, and thus, rotational driving attenuates or stops. That is, a rotation driving force of the engine is interrupted to the clutch center 40.

In the clutch-OFF state, clutch oil distributed in the hollow portion H of the output shaft 15 and having flowed out of the distal end 15T of the output shaft 15 is guided into the clutch center 40 in the same or substantially the same manner as in the clutch-ON state. At this time, since the pressure plate 70 is separated from the clutch center 40, the amount of fitting between the pressure plate 70 and each of the center-side fitting portion 58 and the pressure-side fitting portion 88 decreases. As a result, clutch oil in the cylindrical portion 80 actively flows out of the clutch center 40, and is distributed to portions in the clutch device 10. In particular, clutch oil can be actively guided to gaps between the input-side rotating plates 20 and the output-side rotating plates 22 separated from each other.

Then, when the driver cancels the clutch operation lever in the clutch-OFF state, pressing of the pressure plate 70 by the clutch release mechanism (not shown) through the push member 16B is canceled, and thus, the pressure plate 70 is displaced with a biasing force of the pressure springs 25 to a direction (first direction D1) of approaching the clutch center 40.

As described above, in the clutch device 10 according to this preferred embodiment, clutch oil that has flowed out of, for example, the output shaft 15 is discharged to the outside of the clutch center 40 through, for example, the oil flow holes 49. Since the input-side rotating plates 20 and the output-side rotating plates 22 are held outside the clutch center 40, while the pressure plate 70 and the clutch center 40 rotate, clutch oil is partially supplied to the input-side rotating plates 20 and the output-side rotating plates 22. In addition, the pressure-side fitting teeth 77 are located radially outward of the center-side fitting teeth 47. The end 77T of each of the pressure-side fitting teeth 77T in the first direction D1 is located ahead, in the first direction D1, of the end 47T of the corresponding one of the center-side fitting teeth 47 in the second direction D2. At least portions of some of the plurality of pressure-side fitting teeth 77 overlap with the center-side fitting teeth 47 in the radial directions. Thus, in these portions, even while the pressure plate 70 and the clutch center 40 rotate, a portion of clutch oil is not spattered and can be held. Accordingly, clutch oil can be supplied little by little to the output-side rotating plates 22 and the input-side rotating plates 20 near the pressure plate 70. On the other hand, at least portions of other pressure-side fitting teeth 77 of the plurality of pressure-side fitting teeth 77 do not overlap with the center-side fitting teeth 47 in the radial direction. Accordingly, in these portions, when the pressure plate 70 and the clutch center 40 rotate, clutch oil is spattered to the outside, and thus, clutch oil can be immediately supplied to the output-side rotating plates 22 and the input-side rotating plates 20.

In the clutch device 10 according to this preferred embodiment, some of the plurality of pressure-side fitting teeth 77 overlap with the center-side fitting teeth 47 in a half or more of the length of the pressure-side fitting teeth 77 in the circumferential directions S with respect to the radial directions, and others of the pressure-side fitting teeth 77 do not overlap with the center-side fitting teeth 47 in a half or more of the length of the pressure-side fitting teeth 77 in the circumferential directions S with respect to the radial directions. In this configuration, holding of clutch oil and spattering of clutch oil to the outside can be well balanced in the pressure-side fitting teeth 77.

In the clutch device 10 according to this preferred embodiment, the clutch center 40 includes the plurality of center-side cam portions 60 located radially outward of the output shaft holding portion 50 and each including the center-side assist cam surface 60A and the center-side slipper cam surface 60S, the center-side assist cam surface 60A is operable to generate a force in a direction of causing the pressure plate 70 to approach the clutch center 40 in order to increase a pressing force between the input-side rotating plates 20 and the output-side rotating plates 22 upon rotation relative to the pressure plate 70, the center-side slipper cam surface 60S is operable to cause the pressure plate 70 to move away from the clutch center 40 in order to reduce the pressing force between the input-side rotating plates 20 and the output-side rotating plates 22 upon rotation relative to the pressure plate 70, the oil flow holes 49 are located at sides of the plurality of center-side cam portions 60, and the number of the center-side fitting teeth 47 is a multiple of the number of the center-side cam portions 60. In this configuration, the center-side cam portions 60 have the same positional relationship as that of the oil flow holes 49. Accordingly, variations of the amount of clutch oil discharged to the outside from each of the oil flow holes 49 can be reduced.

In the clutch device 10 according to this preferred embodiment, the number of the center-side cam portions 60 is three, and the number of the center-side fitting teeth 47 is a multiple of three, for example. In this configuration, upon relative rotation of the clutch center 40 to the pressure plate 70, an increase and a decrease of a pressing force between the input-side rotating plates 20 and the output-side rotating plates 22 can be well balanced.

In the clutch device 10 according to this preferred embodiment, at least portions of the spline grooves 48 including the oil flow holes 49 do not overlap with the pressure-side fitting teeth 77 in the radial directions. In this configuration, clutch oil that has flowed from the oil flow holes 49 to the outside of the clutch center 40 can be effectively supplied to the input-side rotating plates 20 and the output-side rotating plates 22.

In the clutch device 10 according to this preferred embodiment, the spline grooves 48 including the oil flow holes 49 do not overlap with the pressure-side fitting teeth 77 in the radial directions. In this configuration, clutch oil that has flowed from the oil flow holes 49 to the outside of the clutch center 40 can be more effectively supplied to the input-side rotating plates 20 and the output-side rotating plates 22.

In the clutch device 10 according to this preferred embodiment, when seen in the axial directions (i.e., directions D) of the output shaft 15, the minimum angle 65 defined by the straight line passing through the center 15C of the output shaft 15 and the end 77SA of one pressure-side fitting tooth 77E at the side of the first circumferential direction S1 in the pressure-side fitting teeth 77 adjacent to each other in the circumferential directions S and the straight line passing through the center 15c of the output shaft 15 and the end 77SB of another pressure-side fitting tooth 77F at the side of the second circumferential direction S2 in the pressure-side fitting teeth 77 adjacent to each other in the circumferential directions S is smaller than the angle θ6 defined by the straight line passing through the center 50C of the output shaft holding portion 50 and the end 47SA of one center-side fitting tooth 47D at the side of the first circumferential direction S1 in the center-side fitting teeth 47 adjacent to each other in the circumferential directions S and the straight line passing through the center 50C of the output shaft holding portion 50 and the end 47SB of another center-side fitting tooth 47E at the side of the second circumferential direction S2 in the center-side fitting teeth 47 adjacent to each other in the circumferential directions S. In this configuration, holding of clutch oil and spattering of clutch oil to the outside can be well balanced in the pressure-side fitting teeth 77.

In the clutch device 10 according to this preferred embodiment, the clutch center 40 includes the oil flow holes 49 located in the spline grooves 48 to penetrate the outer peripheral wall 45 and allowing clutch oil having flowed out of the output shaft 15 to the outside of the clutch center 40, the pressure plate 70 includes the cylindrical portion 80 housing the distal end 15T of the output shaft 15, and the pressure-side fitting teeth 77 are located radially outward of the cylindrical portion 80. In this configuration, clutch oil that has flowed from the distal end 15T of the output shaft 15 to the cylindrical portion 80 through the oil flow holes 49 can be more efficiently discharged to the outside of the clutch center 40.

The foregoing description is directed to the first preferred embodiment of the present disclosure. The first preferred embodiment described above, however, is merely an example, and the present disclosure can be performed in various modes and through various preferred embodiments.

The overlapping state of the pressure-side fitting teeth and the center-side fitting teeth recited in claims is irrelevant to whether or not the input-side rotating plates and the output-side rotating plates are attached to the clutch center and the pressure plate. In other words, if the overlapping state of the pressure-side fitting teeth and the center-side fitting teeth conforms to the state recited in claims with the input-side rotating plates and the output-side rotating plates not being attached to the clutch center and the pressure plate, this overlapping state is included in the scope of the claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A clutch device that allows or interrupts transfer of a rotation driving force of an input shaft to an output shaft, the clutch device comprising:
a clutch center housed in a clutch housing holding a plurality of input-side rotating plates to be rotationally driven by rotational driving of the input shaft, the clutch center being operable to hold a plurality of output-side rotating plates and to be rotationally driven together with the output shaft, the input-side rotating plates and the output-side rotating plates being alternately arranged; and
a pressure plate movable toward or away from the clutch center and rotatable relative to the clutch center to press the input-side rotating plates and the output-side rotating plates; wherein
the clutch center includes:
an output shaft holding portion to which the output shaft is coupled;
an outer peripheral wall located radially outward of the output shaft holding portion;
a plurality of center-side fitting teeth holding the output-side rotating plates, projecting radially outward from an outer peripheral surface of the outer peripheral wall, and arranged in circumferential directions;
a plurality of spline grooves each located between adjacent ones of the center-side fitting teeth; and
a plurality of center-side cam portions located radially outward of the output shaft holding portion and each including a center-side assist cam surface operable to generate a force in a direction from the pressure plate toward the clutch center in order to increase a pressing force between the input-side rotating plates and the output-side rotating plates upon rotation relative to the pressure plate;
the pressure plate includes:
a plurality of pressure-side fitting teeth holding the output-side rotating plates and arranged in the circumferential directions; and
a plurality of pressure-side cam portions each including a pressure-side assist cam surface to generate a force in a direction from the pressure plate toward the clutch center in order to increase the pressing force between the input-side rotating plates and the output-side rotating plates upon rotation relative to the clutch center;
the pressure-side fitting teeth are located radially outward of the center-side fitting teeth to be spaced apart from the center-side fitting teeth in radial directions of the output shaft;
assuming a direction in which the pressure plate approaches the clutch center is a first direction and a direction in which the pressure plate moves away from the clutch center is a second direction, when the center-side assist cam surface and the pressure-side assist cam surface contact each other, an end of each of the pressure-side fitting teeth in the first direction is located ahead, in the first direction, of an end of a corresponding one of the center-side fitting teeth in the second direction; and
when the center-side assist cam surface and the pressure-side assist cam surface contact each other, at least portions of some of the plurality of pressure-side fitting teeth overlap with the center-side fitting teeth in about one half or more of a length of the pressure-side fitting teeth in the circumferential directions when the pressure-side fitting teeth are respectively seen in the radial directions of the output shaft, and at least portions of others of the plurality of pressure-side fitting teeth do not overlap with the center-side fitting teeth in about one half or more of the length of the pressure-side fitting teeth in the circumferential directions when the pressure-side fitting teeth are respectively seen in the radial directions of the output shaft;
the clutch center includes oil flow holes located in the spline grooves to penetrate the outer peripheral wall to allow clutch oil that has flowed out of the output shaft to flow outside of the clutch center; and at least portions of the spline grooves including the oil flow holes do not overlap with the pressure-side fitting teeth when seen in the radial directions of the output shaft.

2. The clutch device according to claim 1, wherein each of the center-side cam portions includes a center-side slipper cam surface to cause the pressure plate to move away from the clutch center in order to reduce the pressing force between the input-side rotating plates and the output-side rotating plates upon rotation relative to the pressure plate;

the oil flow holes are located at sides of the center-side cam portions; and a number of the center-side fitting teeth is a multiple of a number of the center-side cam portions.

3. The clutch device according to claim 2, wherein the number of the center-side cam portions is three, and the number of the center-side fitting teeth is a multiple of three.

4. The clutch device according to claim 1, wherein the spline grooves including the oil flow holes do not overlap with the pressure-side fitting teeth when seen in the radial directions of the output shaft.

5. The clutch device according to claim 1, wherein each of the pressure-side cam portions includes a pressure-side slipper cam surface to cause the pressure plate to move away from the clutch center in order to reduce the pressing force between the input-side rotating plates and the output-side rotating plates upon rotation relative to the clutch center; and assuming a circumferential direction from one of the pressure-side cam portions to another of the pressure-side cam portions is a first circumferential direction and a circumferential direction from the another of the pressure-side cam portions to the one of the pressure-side cam portions is a second circumferential direction;

when seen in axial directions of the output shaft, a minimum angle defined by a straight line passing through a center of the output shaft and an end of one pressure-side fitting tooth at a side of the first circumferential direction in the pressure-side fitting teeth adjacent to each other in the circumferential directions and a straight line passing through the center of the output shaft and an end of another pressure-side fitting tooth at a side of the second circumferential direction in the pressure-side fitting teeth adjacent to each other in the circumferential directions is smaller than an angle defined by a straight line passing through a center of the output shaft holding portion and an end of one center-side fitting tooth at a side of the first circumferential direction in the center-side fitting teeth adjacent to each other in the circumferential directions and a straight line passing through the center of the output shaft holding portion and an end of another center-side fitting tooth at a side of the second circumferential direction in the center-side fitting teeth adjacent to each other in the circumferential directions.

6. The clutch device according to claim 1, wherein the pressure plate includes a cylindrical or substantially cylindrical portion housing a distal end of the output shaft; and the pressure-side fitting teeth are located radially outward of the cylindrical portion.

7. A motorcycle comprising the clutch device according to claim 1.

8. A clutch device that allows or interrupts transfer of a rotation driving force of an input shaft to an output shaft, the clutch device comprising:

a clutch center housed in a clutch housing holding a plurality of input-side rotating plates to be rotationally driven by rotational driving of the input shaft, the clutch center being operable to hold a plurality of output-side rotating plates and to be rotationally driven together with the output shaft, the input-side rotating plates and the output-side rotating plates being alternately arranged; and a pressure plate movable toward or away from the clutch center and rotatable relative to the clutch center to press the input-side rotating plates and the output-side rotating plates; wherein the clutch center includes:

an output shaft holding portion to which the output shaft is coupled;

an outer peripheral wall located radially outward of the output shaft holding portion;

a plurality of center-side fitting teeth holding the output-side rotating plates, projecting radially outward from an outer peripheral surface of the outer peripheral wall, and arranged in circumferential directions;

a plurality of spline grooves each located between adjacent ones of the center-side fitting teeth; and a plurality of center-side cam portions located radially outward of the output shaft holding portion and each including a center-side assist cam surface operable to generate a force in a direction from the pressure plate toward the clutch center in order to increase a pressing force between the input-side rotating plates and the output-side rotating plates upon rotation relative to the pressure plate;

the pressure plate includes:

a plurality of pressure-side fitting teeth holding the output-side rotating plates and arranged in the circumferential directions; and a plurality of pressure-side cam portions each including a pressure-side assist cam surface to generate a force in a direction from the pressure plate toward the clutch center in order to increase the pressing force between the input-side rotating plates and the output-side rotating plates upon rotation relative to the clutch center;

the pressure-side fitting teeth are located radially outward of the center-side fitting teeth to be spaced apart from the center-side fitting teeth in radial directions of the output shaft;

assuming a direction in which the pressure plate approaches the clutch center is a first direction and a direction in which the pressure plate moves away from the clutch center is a second direction, when the center-side assist cam surface and the pressure-side assist cam surface contact each other, an end of each of the pressure-side fitting teeth in the first direction is located ahead, in the first direction, of an end of a corresponding one of the center-side fitting teeth in the second direction;

when the center-side assist cam surface and the pressure-side assist cam surface contact each other, at least portions of some of the plurality of pressure-side fitting teeth overlap with the center-side fitting teeth in about one half or more of a length of the pressure-side fitting teeth in the circumferential directions when the pressure-side fitting teeth are respectively seen in the radial directions of the output shaft, and at least portions of others of the plurality of pressure-side fitting teeth do not overlap with the center-side fitting teeth in about one half or more of the length of the pressure-side fitting teeth in the circumferential directions when the pressure-side fitting teeth are respectively seen in the radial directions of the output shaft;

the clutch center includes:
a plurality of bosses located radially outward of the output shaft holding portion and extending toward the pressure plate;

the pressure-side fitting teeth include a pair of side surfaces arranged in the circumferential directions and a top surface connecting radially outer ends of the pair of side surfaces; and when the center-side assist cam surface and the pressure-side assist cam surface contact each other and in each area defined in the circumferential directions by a plurality of straight lines passing through an axial center of the output shaft and a center of the plurality of bosses when seen in axial directions of the output shaft, at least portions of some of the plurality of pressure-side fitting teeth overlap with the center-side fitting teeth in about one half or more of a length of the top surface of the pressure-side fitting teeth in the circumferential directions when the pressure-side fitting teeth are respectively seen in the radial directions of the output shaft, and at least portions of others of the plurality of pressure-side fitting teeth do not overlap with the center-side fitting teeth in about one half or more of the length of the top surface of the pressure-side fitting teeth in the circumferential directions when the pressure-side fitting teeth are respectively seen in the radial directions of the output shaft.

9. The clutch device according to claim 8, wherein when the center-side assist cam surface and the pressure-side assist cam surface contact each other and in each area defined in the circumferential directions by a plurality of straight lines passing through an axial center of the output shaft and a center of the plurality of bosses when seen in axial directions of the output shaft, at least portions of some of the plurality of pressure-side fitting teeth overlap with the center-side fitting teeth in about one half or more of the length of the pressure-side fitting teeth in the circumferential directions when the pressure-side fitting teeth are respectively seen in the radial directions of the output shaft, and at least portions of others of the plurality of pressure-side fitting teeth do not overlap with the center-side fitting teeth in about one half or more of the length of the pressure-side fitting teeth in the circumferential directions when the pressure-side fitting teeth are respectively seen in the radial directions of the output shaft.

10. A clutch device that allows or interrupts transfer of a rotation driving force of an input shaft to an output shaft, the clutch device comprising:

a clutch center housed in a clutch housing holding a plurality of input-side rotating plates to be rotationally driven by rotational driving of the input shaft, the clutch center being operable to hold a plurality of output-side rotating plates and to be rotationally driven together with the output shaft, the input-side rotating plates and the output-side rotating plates being alternately arranged; and a pressure plate movable toward or away from the clutch center and rotatable relative to the clutch center to press the input-side rotating plates and the output-side rotating plates; wherein the clutch center includes:
an output shaft holding portion to which the output shaft is coupled;
an outer peripheral wall located radially outward of the output shaft holding portion;
a plurality of center-side fitting teeth holding the output-side rotating plates, projecting radially outward from an outer peripheral surface of the outer peripheral wall, and arranged in circumferential directions;
a plurality of spline grooves each located between adjacent ones of the center-side fitting teeth; and
a plurality of center-side cam portions located radially outward of the output shaft holding portion and each including a center-side assist cam surface operable to generate a force in a direction from the pressure plate toward the clutch center in order to increase a pressing force between the input-side rotating plates and the output-side rotating plates upon rotation relative to the pressure plate;

the pressure plate includes:
a plurality of pressure-side fitting teeth holding the output-side rotating plates and arranged in the circumferential directions; and
a plurality of pressure-side cam portions each including a pressure-side assist cam surface to generate a force in a direction from the pressure plate toward the clutch center in order to increase the pressing force between the input-side rotating plates and the output-side rotating plates upon rotation relative to the clutch center;

the pressure-side fitting teeth are located radially outward of the center-side fitting teeth to be spaced apart from the center-side fitting teeth in radial directions of the output shaft;

assuming a direction in which the pressure plate approaches the clutch center is a first direction and a direction in which the pressure plate moves away from the clutch center is a second direction, when the center-side assist cam surface and the pressure-side assist cam surface contact each other, an end of each of the pressure-side fitting teeth in the first direction is located ahead, in the first direction, of an end of a corresponding one of the center-side fitting teeth in the second direction;

when the center-side assist cam surface and the pressure-side assist cam surface contact each other, at least portions of some of the plurality of pressure-side fitting teeth overlap with the center-side fitting teeth in about one half or more of a length of the pressure-side fitting teeth in the circumferential directions when the pressure-side fitting teeth are respectively seen in the radial directions of the output shaft, and at least portions of others of the plurality of pressure-side fitting teeth do not overlap with the center-side fitting teeth in about one half or more of the length of the pressure-side fitting teeth in the circumferential directions when the pressure-side fitting teeth are respectively seen in the radial directions of the output shaft;

the clutch center includes:
a plurality of bosses located radially outward of the output shaft holding portion and extending toward the pressure plate;

the pressure-side fitting teeth include a pair of side surfaces arranged in the circumferential directions and a top surface connecting radially outer ends of the pair of side surfaces;

the center-side fitting teeth include a pair of side surfaces arranged in the circumferential directions and a top surface connecting radially outer ends of the pair of side surfaces; and when the center-side assist cam surface and the pressure-side assist cam surface contact each other and in each area defined in the circumferential directions by a plurality of straight lines passing through an axial center of the output shaft and a center of the plurality of bosses when seen in axial directions of the output shaft, at least portions of some of the plurality of pressure-side fitting teeth overlap with the top surface of the center-side fitting teeth in about one half or more of a length of the top surface of the pressure-side fitting teeth in the circumferential directions when the pressure-side fitting teeth are respectively seen in the radial directions of the output shaft, and at least portions of others of the plurality of pressure-side fitting teeth do not overlap with the top surface of the center-side fitting teeth in about one half or more of the length of the top surface of the pressure-side fitting teeth in the circumferential directions when the pressure-side fitting teeth are respectively seen in the radial directions of the output shaft.

11. A clutch device that allows or interrupts transfer of a rotation driving force of an input shaft to an output shaft, the clutch device comprising:
   a clutch center housed in a clutch housing holding a plurality of input-side rotating plates to be rotationally driven by rotational driving of the input shaft, the clutch center being operable to hold a plurality of output-side rotating plates and to be rotationally driven together with the output shaft, the input-side rotating plates and the output-side rotating plates being alternately arranged; and
   a pressure plate movable toward or away from the clutch center and rotatable relative to the clutch center to press the input-side rotating plates and the output-side rotating plates; wherein
   the clutch center includes:
      an output shaft holding portion to which the output shaft is coupled;
      an outer peripheral wall located radially outward of the output shaft holding portion;
      a plurality of center-side fitting teeth holding the output-side rotating plates, projecting radially outward from an outer peripheral surface of the outer peripheral wall, and arranged in circumferential directions;
      a plurality of spline grooves each located between adjacent ones of the center-side fitting teeth; and
      a plurality of center-side cam portions located radially outward of the output shaft holding portion and each including a center-side assist cam surface operable to generate a force in a direction from the pressure plate toward the clutch center in order to increase a pressing force between the input-side rotating plates and the output-side rotating plates upon rotation relative to the pressure plate:
   the pressure plate includes:
      a plurality of pressure-side fitting teeth holding the output-side rotating plates and arranged in the circumferential directions; and
      a plurality of pressure-side cam portions each including a pressure-side assist cam surface to generate a force in a direction from the pressure plate toward the clutch center in order to increase the pressing force between the input-side rotating plates and the output-side rotating plates upon rotation relative to the clutch center;
   the pressure-side fitting teeth are located radially outward of the center-side fitting teeth to be spaced apart from the center-side fitting teeth in radial directions of the output shaft;
   assuming a direction in which the pressure plate approaches the clutch center is a first direction and a direction in which the pressure plate moves away from the clutch center is a second direction, when the center-side assist cam surface and the pressure-side assist cam surface contact each other, an end of each of the pressure-side fitting teeth in the first direction is located ahead, in the first direction, of an end of a corresponding one of the center-side fitting teeth in the second direction;
   when the center-side assist cam surface and the pressure-side assist cam surface contact each other, at least portions of some of the plurality of pressure-side fitting teeth overlap with the center-side fitting teeth in about one half or more of a length of the pressure-side fitting teeth in the circumferential directions when the pressure-side fitting teeth are respectively seen in the radial directions of the output shaft, and at least portions of others of the plurality of pressure-side fitting teeth do not overlap with the center-side fitting teeth in about one half or more of the length of the pressure-side fitting teeth in the circumferential directions when the pressure-side fitting teeth are respectively seen in the radial directions of the output shaft;
   the pressure plate includes:
      a plurality of pressure-side cam holes each located between the plurality of pressure-side cam portions in the circumferential directions;
   the pressure-side fitting teeth include a pair of side surfaces arranged in the circumferential directions and a top surface connecting radially outer ends of the pair of side surfaces;
   assuming a circumferential direction from one of the pressure-side cam portions to another of the pressure-side cam portions is a first circumferential direction and a circumferential direction from the another of the pressure-side cam portions to the one of the pressure-side cam portions is a second circumferential direction, the clutch center rotates in the first circumferential direction; and
   when the center-side assist cam surface and the pressure-side assist cam surface contact each other and in each area defined in the circumferential directions by a plurality of straight lines passing through an axial center of the output shaft and an end of the plurality of pressure-side cam holes in the second circumferential direction when seen in axial directions of the output shaft, at least portions of some of the plurality of pressure-side fitting teeth overlap with the center-side fitting teeth in about one half or more of a length of the top surface of the pressure-side fitting teeth in the circumferential directions when the pressure-side fitting teeth are respectively seen in the radial directions of the output shaft, and at least portions of others of the plurality of pressure-side fitting teeth do not overlap with the center-side fitting teeth in about one half or more of the length of the top surface of the pressure-side fitting teeth in the circumferential directions when the pressure-side fitting teeth are respectively seen in the radial directions of the output shaft.

12. The clutch device according to claim 11, wherein when the center-side assist cam surface and the pressure-side assist cam surface contact each other and in each area defined in the circumferential directions by a plurality of straight lines passing through an axial center of the output shaft and an end of the plurality of pressure-side cam holes in the second circumferential direction when seen in axial directions of the output shaft, at least portions of some of the plurality of pressure-side fitting teeth overlap with the center-side fitting teeth in about one half or more of a length of the pressure-side fitting teeth in the circumferential directions when the pressure-side fitting teeth are respectively seen in the radial directions of the output shaft, and at least portions of others of the plurality of pressure-side fitting teeth do not overlap with the center-side fitting teeth in about one half or more of the length of the pressure-side fitting teeth in the circumferential directions when the pressure-side fitting teeth are respectively seen in the radial directions of the output shaft.

13. A clutch device that allows or interrupts transfer of a rotation driving force of an input shaft to an output shaft, the clutch device comprising:
   a clutch center housed in a clutch housing holding a plurality of input-side rotating plates to be rotationally driven by rotational driving of the input shaft, the clutch center being operable to hold a plurality of output-side rotating plates and to be rotationally driven together with the output shaft, the input-side rotating plates and the output-side rotating plates being alternately arranged; and
   a pressure plate movable toward or away from the clutch center and rotatable relative to the clutch center to press the input-side rotating plates and the output-side rotating plates; wherein
   the clutch center includes:
      an output shaft holding portion to which the output shaft is coupled;
      an outer peripheral wall located radially outward of the output shaft holding portion;
      a plurality of center-side fitting teeth holding the output-side rotating plates, projecting radially outward from an outer peripheral surface of the outer peripheral wall, and arranged in circumferential directions;
      a plurality of spline grooves each located between adjacent ones of the center-side fitting teeth; and
      a plurality of center-side cam portions located radially outward of the output shaft holding portion and each including a center-side assist cam surface operable to generate a force in a direction from the pressure plate toward the clutch center in order to increase a pressing force between the input-side rotating plates and the output-side rotating plates upon rotation relative to the pressure plate;
   the pressure plate includes:
      a plurality of pressure-side fitting teeth holding the output-side rotating plates and arranged in the circumferential directions; and
      a plurality of pressure-side cam portions each including a pressure-side assist cam surface to generate a force in a direction from the pressure plate toward the clutch center in order to increase the pressing force between the input-side rotating plates and the output-side rotating plates upon rotation relative to the clutch center;
   the pressure-side fitting teeth are located radially outward of the center-side fitting teeth to be spaced apart from the center-side fitting teeth in radial directions of the output shaft;
   assuming a direction in which the pressure plate approaches the clutch center is a first direction and a direction in which the pressure plate moves away from the clutch center is a second direction, when the center-side assist cam surface and the pressure-side assist cam surface contact each other, an end of each of the pressure-side fitting teeth in the first direction is located ahead, in the first direction, of an end of a corresponding one of the center-side fitting teeth in the second direction;
   when the center-side assist cam surface and the pressure-side assist cam surface contact each other, at least portions of some of the plurality of pressure-side fitting teeth overlap with the center-side fitting teeth in about one half or more of a length of the pressure-side fitting teeth in the circumferential directions when the pressure-side fitting teeth are respectively seen in the radial directions of the output shaft, and at least portions of others of the plurality of pressure-side fitting teeth do not overlap with the center-side fitting teeth in about one half or more of the length of the pressure-side fitting teeth in the circumferential directions when the pressure-side fitting teeth are respectively seen in the radial directions of the output shaft;
   the pressure plate includes:
      a plurality of pressure-side cam holes each located between the plurality of pressure-side cam portions in the circumferential directions;
   the pressure-side fitting teeth include a pair of side surfaces arranged in the circumferential directions and a top surface connecting radially outer ends of the pair of side surfaces;
   the center-side fitting teeth include a pair of side surfaces arranged in the circumferential directions and a top surface connecting radially outer ends of the pair of side surfaces;
   assuming a circumferential direction from one of the pressure-side cam portions to another of the pressure-side cam portions is a first circumferential direction and a circumferential direction from the another of the pressure-side cam portions to the one of the pressure-side cam portions is a second circumferential direction, the clutch center rotates in the first circumferential direction; and
   when the center-side assist cam surface and the pressure-side assist cam surface contact each other and in each area defined in the circumferential directions by a plurality of straight lines passing through an axial center of the output shaft and an end of the plurality of pressure-side cam holes in the second circumferential direction when seen in axial directions of the output shaft, at least portions of some of the plurality of pressure-side fitting teeth overlap with the top surface of the center-side fitting teeth in about one half or more of a length of the top surface of the pressure-side fitting teeth in the circumferential directions when the pressure-side fitting teeth are respectively seen in the radial directions of the output shaft, and at least portions of others of the plurality of pressure-side fitting teeth do not overlap with the top surface of the center-side fitting teeth in about one half or more of the length of the top surface of the pressure-side fitting teeth in the circumferential directions when the pressure-side fitting teeth are respectively seen in the radial directions of the output shaft.

* * * * *